US008620255B2

(12) United States Patent
Edge et al.

(10) Patent No.: US 8,620,255 B2
(45) Date of Patent: Dec. 31, 2013

(54) METHOD AND APPARATUS FOR SUPPORTING EMERGENCY CALLS AND LOCATION FOR FEMTO ACCESS POINTS

(75) Inventors: Stephen W. Edge, Escondido, CA (US); Kirk Allan Burroughs, Alamo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 12/483,946

(22) Filed: Jun. 12, 2009

(65) Prior Publication Data

US 2009/0311987 A1 Dec. 17, 2009

Related U.S. Application Data

(60) Provisional application No. 61/061,981, filed on Jun. 16, 2008, provisional application No. 61/091,250, filed on Aug. 22, 2008.

(51) Int. Cl.
*H04M 11/04* (2006.01)
*H04M 3/42* (2006.01)
*H04B 7/00* (2006.01)

(52) U.S. Cl.
USPC ............... 455/404.1; 455/404.2; 455/521; 455/414.2

(58) Field of Classification Search
USPC ............... 455/404.1, 404.2, 521, 414.2
See application file for complete search history.

(56) References Cited

U.S. PATENT DOCUMENTS 7,831,216 B1 * 11/2010 Yenney et al. ............... 455/88
2004/0147232 A1    7/2004 Zodnik
2004/0180655 A1 *  9/2004 Jang et al. .................. 455/433
(Continued)

FOREIGN PATENT DOCUMENTS

EP         1617696 A1    1/2006
JP       2001309421     11/2001
(Continued)

OTHER PUBLICATIONS

Hyun Soo Kim et al., "Performance Analysis of Position Location Methods based on IS-801 Standard" Proceedings of the Institute of Navigation (ION) GPS, XX, XX, Sep. 22, 2000, pp. 545-553, XP002315981, p. 547, left-hand column, line 1-line 18.

(Continued)

*Primary Examiner* — Ariel Balaoing
*Assistant Examiner* — Christopher Kohlman
(74) *Attorney, Agent, or Firm* — Arnold J. Gum

(57) ABSTRACT

Techniques for routing an emergency call originated by a mobile station via a femto access point (FAP) in a wireless network and for locating the mobile station are described. In an aspect, the emergency call may be routed to an appropriate emergency center based on location information for the FAP. In one design, the location information for the FAP may include a macro cell identity (ID) and/or a macro Mobile Switching Center (MSC) ID determined based on the FAP location. The macro cell ID and/or the macro MSC ID may be assigned to the FAP and used to access a database, which may store routing information for emergency centers versus cell IDs and MSC IDs. In another design, the location information for the FAP may include a location estimate for the FAP. The location estimate may be used to access a geographic database, which may store routing information for emergency centers for different geographic areas.

42 Claims, 12 Drawing Sheets

(56) References Cited

U.S. PATENT DOCUMENTS

| | | | |
|---|---|---|---|
| 2005/0144647 A1 | 6/2005 | Zussman et al. | |
| 2006/0014517 A1 | 1/2006 | Barclay et al. | |
| 2006/0286961 A1 | 12/2006 | Levitan et al. | |
| 2007/0238448 A1* | 10/2007 | Gallagher et al. | 455/414.2 |
| 2007/0293239 A1 | 12/2007 | Dawson et al. | |
| 2008/0076425 A1 | 3/2008 | Khetawat et al. | |
| 2008/0085699 A1 | 4/2008 | Hirano et al. | |
| 2008/0188243 A1 | 8/2008 | Giustina et al. | |
| 2008/0267114 A1 | 10/2008 | Mukherjee et al. | |
| 2008/0273670 A1* | 11/2008 | Dickinson | 379/45 |
| 2008/0305792 A1* | 12/2008 | Khetawat et al. | 455/435.1 |
| 2009/0265543 A1 | 10/2009 | Khetawat et al. | |
| 2009/0298515 A1* | 12/2009 | Czaja et al. | 455/456.5 |
| 2010/0041364 A1 | 2/2010 | Lott et al. | |
| 2010/0041418 A1 | 2/2010 | Edge et al. | |
| 2010/0120447 A1 | 5/2010 | Anderson et al. | |
| 2010/0240397 A1 | 9/2010 | Buchmayer et al. | |
| 2011/0003602 A1 | 1/2011 | Kim et al. | |
| 2011/0013528 A1 | 1/2011 | Chen | |
| 2011/0039577 A1 | 2/2011 | Stern-Berkowitz et al. | |
| 2011/0098057 A1 | 4/2011 | Edge et al. | |
| 2011/0250906 A1 | 10/2011 | Siomina et al. | |
| 2011/0256875 A1 | 10/2011 | Edge et al. | |
| 2012/0142313 A1 | 6/2012 | Edge | |
| 2012/0214539 A1 | 8/2012 | Michel | |
| 2013/0109345 A1 | 5/2013 | Edge et al. | |

FOREIGN PATENT DOCUMENTS

| | | |
|---|---|---|
| JP | 2007251357 A | 9/2007 |
| JP | 2009509423 | 3/2009 |
| JP | 2009510970 A | 3/2009 |
| JP | 2009200644 A | 9/2009 |
| JP | 2009543480 A | 12/2009 |
| JP | 2010507963 A | 3/2010 |
| JP | 2010518670 A | 5/2010 |
| KR | 20070092538 A | 9/2007 |
| RU | 2263412 C2 | 3/2004 |
| WO | 0152569 A1 | 7/2001 |
| WO | 2007040450 A1 | 4/2007 |
| WO | WO2008051124 A1 | 5/2008 |
| WO | WO2008051929 A2 | 5/2008 |
| WO | WO2008070842 A1 | 6/2008 |
| WO | WO2008093103 A2 | 8/2008 |
| WO | WO2009058068 | 5/2009 |

OTHER PUBLICATIONS

International Search Report and Written Opinion—PCT/US2009/047484—ISA/EPO—Sep. 10, 2009.

3rd Generation Partnership Project, Technical Specification Group Radio Access Network, Evolved Universal Terrestrial Radio Access Network (E-UTRAN), Stage 2 functional specification of User Equipment (UE) positioning in E-UTRAN (Release 9), 3GPP Standard, 3GPP TS 36.305, 3rd Generation Partnership Project (3GPP), Mobile Competence Centre, 650, Route Des Lucioles, F-06921 Sophia-Antipolis Cedex, France, No. V9.1.0, Dec. 28, 2009, pp. 1-52, XP050401613, [retrieved on Dec. 28, 2009].

Ericsson: "LTE positioning protocol architecture", 3GPP DRAFT, R3-091165, 3RD Generation Partnership Project (3GPP), Mobile Competence Centre, 650, Route Des Lucioles, F-06921 Sophia-Antipolis Cedex, France, No. San Francisco, USA, 20090429, Apr. 29, 2009, XP050341534, [retrieved on Apr. 29, 2009].

QUALCOMM Incorporated, Draft work item proposal: Positioning enhancements for HNB/HeNB, 3GPP TSG RAN Meeting #51, RP-110367, Kansas City, USA, Mar. 15-18, 2011, 5 pages.

Taiwan Search Report—TW098120115—TIPO—Feb. 23, 2013.

3GPP: "3rd Generation Partnership Project; Technical Specification Group Radio Access Network; Home (e)NodeB; Network aspects(Release 8)" 3GPP Draft; R3-083410_R3.020_V0.9.1_Clean_V2, 3rd Generation Partnership Project (3GPP), Mobile Competence Centre; 650, Route des Lucioles; F-06921 Sophiaantipolis Cedex; France, no. Prague, Czech Republic; Nov. 17, 2008, XP050324621, p. 55; figures 6.2.1.2.3-1, p. 51-p. 63.

3rd Generation Partnership Project; Technical Specification Group Services and System Aspects; Evaluation of LCS Control Plane Solutions for EPS (Release 9), 3GPP Standard; 3GPP TR 23.891, 3rd Generation Partnership Project (3GPP), Mobile Competence Centre; 650, Route des Lucioles; F-06921 Sophia-Antipolis Cedex; France, no. V.0.4.0, Feb. 1, 2009, pp. 1-64, XP050380738.

3rd Generation Partnership Project; Technical Specification Group Services and System Aspects; Functional stage 2 description of Location Services (LCS) (Release 9), 3GPP Standard; 3GPP TS 23.271, 3rd Generation Partnership Project (3GPP), Mobile Competence Centre; 650, Route des Lucioles; F-06921 Sophia-Antipolis Cedex; France, no. V9.3.0, Mar. 25, 2010, pp. 1-169, XP050402061, [retrieved on Mar. 25, 2010].

3rd Generation Partnership Project; Technical Specification Group Services and System UTRAN Iupc interface Positioning Calculation Application Part (PCAP) signalling (Release 9), 3GPP Standard; 3GPP TR 23.891, 3rd Generation Partnership Project (3GPP), Mobile Competence Centre; 650, Route des Lucioles; F-06921 Sophia-Antipolis Cedex; France, no. V9.1.0, Mar. 31, 2010, pp. 1-49, XP055055712, Retrieved from the Internet: URL: www.3gpp.org [retrieved on Mar. 7, 2012].

Goze T. et al., "Secure User-Plane Location (SUPL) Architecture for Assisted GPS (A-GPS)", 4th Advanced Satellite Mobile Systems (ASMS), Aug. 26, 2008, pp. 229-234, IEEE, Piscataway, NJ, USA, XP031393759, ISBN: 978-1-4244-2160-2.

* cited by examiner

METHOD AND APPARATUS FOR SUPPORTING EMERGENCY CALLS AND LOCATION FOR FEMTO ACCESS POINTS

CLAIM OF PRIORITY UNDER 35 U.S.C. §119

The present Application for Patent claims priority to Provisional U.S. Application Ser. No. 61/061,981, entitled "Support of Emergency Calls and Location for CDMA2000 Femtocells," filed Jun. 16, 2008, and Provisional U.S. Application Ser. No. 61/091,250, entitled "Support of Emergency Calls and Location for cdma2000 Femtocells," filed Aug. 22, 2008, both assigned to the assignee hereof, and expressly incorporated herein by reference.

BACKGROUND

I. Field

The present disclosure relates generally to communication, and more specifically to techniques for supporting emergency calls and location.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may support communication for a number of mobile stations. A mobile station may place an emergency call in response to an emergency event. An emergency call is a call for emergency services (e.g., police, fire, medical, or other emergency services) and may also be referred to as an emergency services call, an E911 call, etc. An emergency call may be initiated by a user dialing a well-known emergency number such as '911' in North America or '112' in Europe. It may be desirable to efficiently route the emergency call to an appropriate emergency center that can handle the call. It may also be desirable to provide the emergency center with the location of the mobile station.

SUMMARY

Techniques for routing an emergency call originated by a mobile station via a femto access point (FAP) in a wireless communication network and for locating the mobile station are described herein. In an aspect, the emergency call from the mobile station may be routed to an appropriate emergency center based on location information for the FAP. The terms "location" and "position" are synonymous and are often used interchangeably. In one design, the location information for the FAP may comprise a macro cell identity (ID) of a macro cell having a strong received signal at the FAP or having overlapping coverage with the FAP. The location information for the FAP may further comprise a macro Mobile Switching Center (MSC) ID, which may be determined based on the macro cell ID. The macro cell ID and/or the macro MSC ID may be assigned to the FAP (e.g., during initialization of the FAP) and may be used to access a database. The database may store routing information for emergency centers versus cell IDs and MSC IDs. In another design, the location information for the FAP may comprise a location estimate for the FAP. The location estimate may be used to access a geographic database, which may store routing information for emergency centers for different geographic areas.

In one design, a mobile station may send a first message to a FAP to originate an emergency call. The FAP may send a second message to a network entity to initiate the emergency call. The FAP may also send location information for the FAP to the network entity for use to select an emergency center for the emergency call. The emergency call may be connected to the emergency center selected based on the location information for the FAP. The mobile station may then communicate with the emergency center for the emergency call.

Various aspects and features of the disclosure are described in further detail below.

DETAILED DESCRIPTION

The techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. For clarity, certain aspects of the techniques are described below for 3GPP2 networks.

Figure 1:
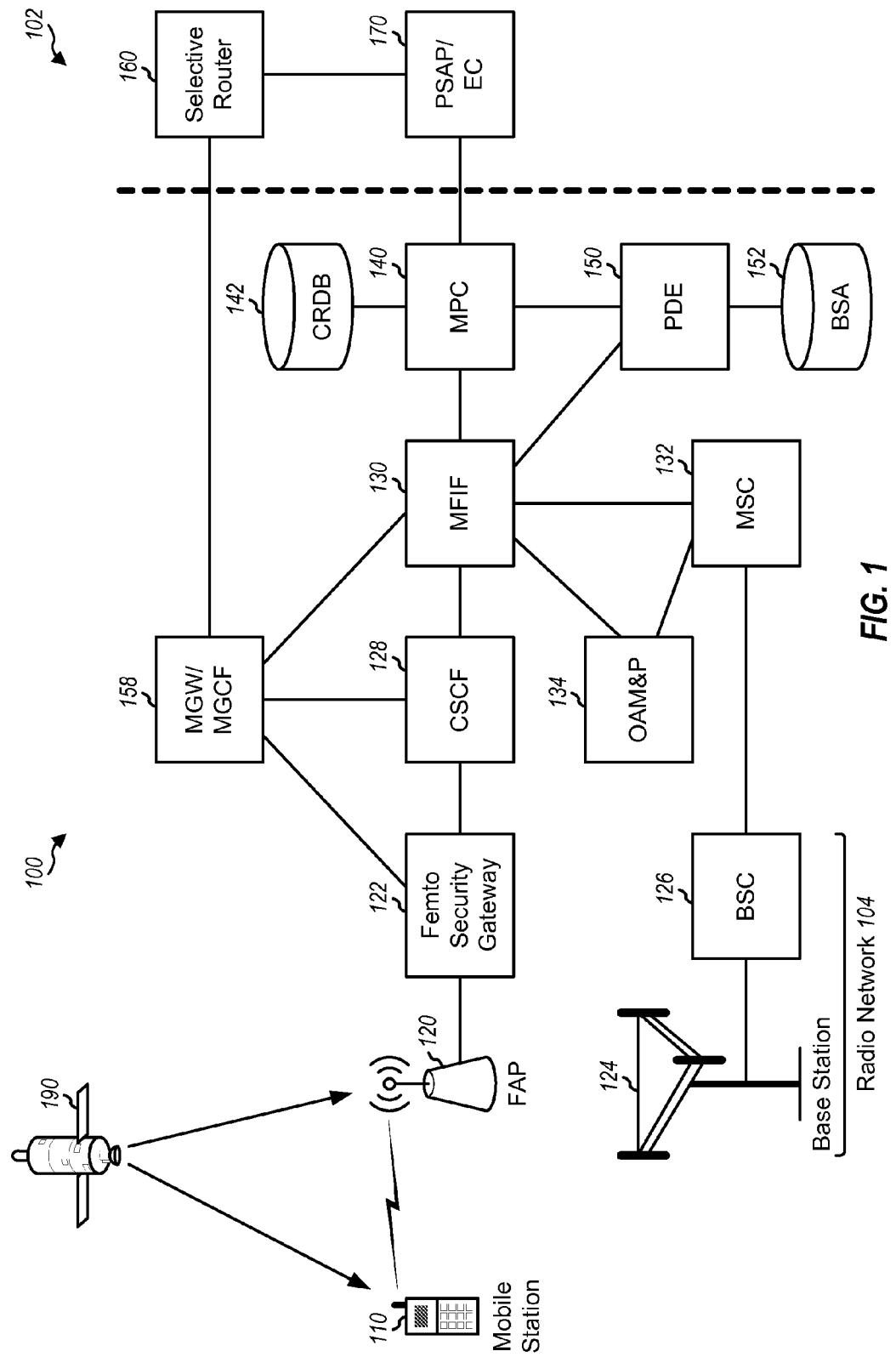
FIG. 1 illustrates an exemplary network deployment.

FIG. 1 shows an exemplary network deployment, which includes a wireless network 100 and a third party network 102. Wireless network 100 includes a radio network 104 and other network entities that can support various services.

Radio network 104 may implement CDMA 1X, High Rate Packet Data (HRPD), or some other radio technology. Radio network 104 may include a number of base stations and a number of femto access points (FAPs) that can support wireless communication for a number of mobile stations. For simplicity, only one FAP 120, only one base station 124, and only one mobile station 110 are shown in FIG. 1. A base station is a station that provides communication coverage for a relatively large area (e.g., a few hundred meters to several kilometers in radius) and may allow unrestricted access by mobile stations with service subscription. A FAP is a station that provides communication coverage for a relatively small area (e.g., a home, an apartment, part of a larger building, etc.) and may allow restricted access by mobile stations having association with the FAP (e.g., mobile stations for users in the home). A base station and/or its coverage area may be referred to as a macro cell. A FAP and/or its coverage area may be referred to as a femto cell. A FAP may also be referred to as a home or femto base station, a home or femto Node B, a home or femto evolved Node B (eNB), etc.

Base station 124 may communicate with a Base Station Controller (BSC) 126, which may further communicate with an MSC 132. MSC 132 may perform switching functions for circuit-switched calls and may also route Short Message Service (SMS) messages. FAP 120 may communicate with a femto security gateway 122, which may provide security (e.g., to the rest of the network) for access via FAPs. Femto security gateway 122 may further communicate with a Call Session Control Function (CSCF) 128, which may provide session control services for access via FAPs and may maintain session state used to support Internet Protocol (IP) Multimedia Subsystem (IMS) services such as Voice-over-IP (VoIP), etc. CSCF 128 may communicate with a Mobile Application Part (MAP) Femto Interworking Function (MFIF) 130, which may support some MSC functionality for access via FAPs and provide an ANSI-41 MAP interface from the FAPs to the rest of the network. MFIF 130 may also be referred to as a Femto Convergence Server (FCS). An Operation, Administration, Maintenance and Provisioning (OAM&P) center 134 may perform various functions to support operation of wireless network 100. OAM&P center 134 may communicate with MFIF 130, MSC 132, and other network entities (not shown in FIG. 1 for simplicity).

A Mobile Positioning Center (MPC) 140 may perform various functions for location services and may support subscriber privacy, authorization, authentication, roaming support, charging/billing, service management, position calculation, etc. MPC 140 may have access to a Coordinate Routing Database (CRDB) 142, which may store a look-up table that maps MSC IDs and cell IDs and/or geographic locations to Public Safety Answering Points/Emergency Centers (PSAP/EC). A Position Determination Entity (PDE) 150 may support positioning for mobile stations. Positioning refers to a process to measure/compute a location estimate of a target device. A location estimate may also be referred to as a position estimate, a position fix, a fix, etc. PDE 150 may have access to a Base Station Almanac (BSA) 152, which may store information (e.g., geographic coordinates, coverage area, transmit power, antenna characteristics, etc.) for cells and base stations in wireless networks. The information in BSA 152 may be used to assist positioning of mobile stations.

A Media Gateway/Media Gateway Control Function (MGW/MGCF) 158 may support conversion between (i) Session Initiation Protocol (SIP)/IP and Call Signaling such as SS7 for a Public Switched Telephone Network (PSTN) and (ii) packetized voice (e.g., transported using IETF RTP) and circuit-switched voice (e.g., transported using ANSI T1 or CEPT E1). MGW/MGCF 158 may be used whenever a VoIP call (e.g., from FAP 120) needs to go to a PSTN user (e.g., a PSAP 170). A router 160 may be selected to route calls between MGW/MGCF 158 and PSAP 170. PSAP 170 may be responsible for answering emergency calls and may be operated or owned by a government agency, e.g., a county or city.

FIG. 1 shows some network entities that may be present in wireless network 100. Wireless network 100 may include network entities supporting packet-switched calls, circuit-switched calls, location services, etc. Wireless network 100 may also implement ANSI-41 mobile networking protocol, which supports identifying and authenticating users and routing of calls to enable roaming and advanced services. ANSI-41 is commonly used for 3GPP2 networks whereas GSM-MAP is commonly used for 3GPP networks.

Mobile station (MS) 110 may be one of many mobile stations supported by wireless network 100. Mobile station 110 may be stationary or mobile and may also be referred to as a user equipment (UE), a terminal, an access terminal, a subscriber unit, a station, etc. Mobile station 110 may be a cellular phone, a personal digital assistant (PDA), a wireless device, a wireless modem, a laptop computer, a telemetry device, a tracking device, etc. Mobile station 110 may be able to communicate with a FAP or a base station at any given moment to obtain communication services.

Mobile station 110 and/or FAP 120 may receive signals from one or more satellites 190, which may be part of the United States Global Positioning System (GPS), the European Galileo system, the Russian GLONASS system, or some other Satellite Positioning System (SPS). Mobile station 110 and/or FAP 120 may measure signals from satellites 190 and obtain pseudo-range measurements for the satellites. Mobile station 110 and/or FAP 120 may also measure signals from base stations in radio network 104 and obtain timing and/or signal strength measurements for the base stations. The pseudo-range measurements, the timing measurements, and/or the signal strength measurements may be used to derive a location estimate for mobile station 110 or FAP 120. Mobile station 110 and FAP 120 may each support one or more positioning methods such as GPS, Assisted GPS (A-GPS), Advanced Forward Link Trilateration (AFLT), etc.

Mobile station 110 may communicate with base station 124 and may initiate an emergency call. A serving cell ID may be provided to MPC 140 during call setup. MPC 140 may access CRDB 142 with the serving cell ID to determine routing information for a PSAP (e.g., PSAP 170) that can receive the emergency call from mobile station 110. The routing information may comprise (i) an Emergency Services Routing Digit (ESRD), which is a non-dialable directory number used to identify and route to PSAP 170, (ii) an Emergency Services Routing Key (ESRK), which is a non-dialable directory number used to identify and route to PSAP 170 as well as to identify the emergency call, or (iii) some other information. Each PSAP may be associated with one ESRD as well as a pool of ESRKs. One ESRK from the pool may be assigned to mobile station 110 for the duration of the emergency call. The emergency call may then be routed to PSAP 170 based on the ESRK or ESRD.

CRDB 142 and BSA 152 may be provisioned with cell IDs, MSC IDs, and locations of base stations in wireless network 100. This information may be used to determine a suitable PSAP for an emergency call from a mobile station communicating with a base station. For example, CRDB 142 may provide an ESRK for a PSAP based on a serving cell ID and an MSC ID for a serving cell. However, CRDB 142 and BSA 152 may not be provisioned with cell IDs, MSC IDs, and locations of FAPs since this information is generally not known before a FAP has been deployed and may then be time consuming and expensive to provision. Thus, CRDB 142 and BSA 152 may not be able to provide routing information for PSAPs for emergency calls originated by mobile stations communicating with FAPs.

In an aspect, routing of emergency calls for mobile stations communicating with FAPs may be supported based on location information for FAPs. Location information for a FAP may comprise any information determined based on the location of the FAP and usable to select a PSAP for an emergency call from a mobile station communicating with the FAP. The location of the FAP may be determined when it is powered up and may be used to ensure that the FAP operates in properly licensed spectrum. The location information for the FAP may be determined based on the location of the FAP, as described below.

MFIF 130 may be assigned a unique MSC ID (or multiple unique MSC IDs) to support ANSI-41 interactions. The MSC ID assigned to MFIF 130 may be referred to as a MFIF MSC ID, an MSC ID 1, etc. FAP 120 may perform initialization after powering on and may be assigned a serving cell ID after being successfully authenticated and authorized. This serving cell ID may be referred to as a femto cell ID, a serving cell ID 1, etc. The femto cell ID may be associated with the MFIF MSC ID and may be used for radio access. The femto cell ID and the MFIF MSC ID may not be provisioned in CRDB 142 or BSA 152.

The location of FAP 120 (i.e., the femto location) may be used to route an emergency call from FAP 120. Several exemplary schemes for routing the emergency call based on the femto location are described below.

In a first scheme for routing an emergency call based on femto location, FAP 120 may be assigned an additional serving cell ID and an additional MSC ID, e.g., during initialization. The additional serving cell ID may be referred to as a macro cell ID, a serving cell ID 2, etc. The additional MSC ID may be referred to as a macro MSC ID, an MSC ID 2, etc. The macro cell ID and the macro MSC ID may be derived based on the location of FAP 120. In one design, the macro cell ID may be a cell ID of a macro cell with the closest antenna to FAP 120, a macro cell with the strongest signal or a strong signal at FAP 120, a macro cell with overlapping coverage with FAP 120, etc. The macro MSC ID may be an MSC ID of an MSC serving this macro cell. The macro cell ID and the macro MSC ID may thus be for an existing macro cell and an existing MSC, respectively, and may be reused for FAP 120 for the purpose of routing emergency calls. In another design, the macro cell ID and the macro MSC ID for FAP 120 may be created and may not correspond to an actual cell or an actual MSC. For example, FAPs may be located outside of the normal network coverage area, and extra serving cell IDs and MSC IDs may be created to cover the extended area in which FAPs may be deployed. Extra serving cell IDs and extra MSC IDs may also be created within the normal coverage area to avoid problems when real cell IDs are changed or deleted, since this would impact FAPs assigned with these real cell IDs. The extra serving cell IDs and extra MSC IDs would not correspond to physical base stations but may be used to support routing of emergency calls from FAPs. For all designs, combinations of macro MSC ID and macro cell ID assignable to FAPs may be provisioned in CRDB 142 and/or BSA 152. The macro cell ID and macro MSC ID assigned to FAP 120 may be used to select an appropriate PSAP for emergency calls using an existing ANSI J-STD-036B procedure.

Figure 2:
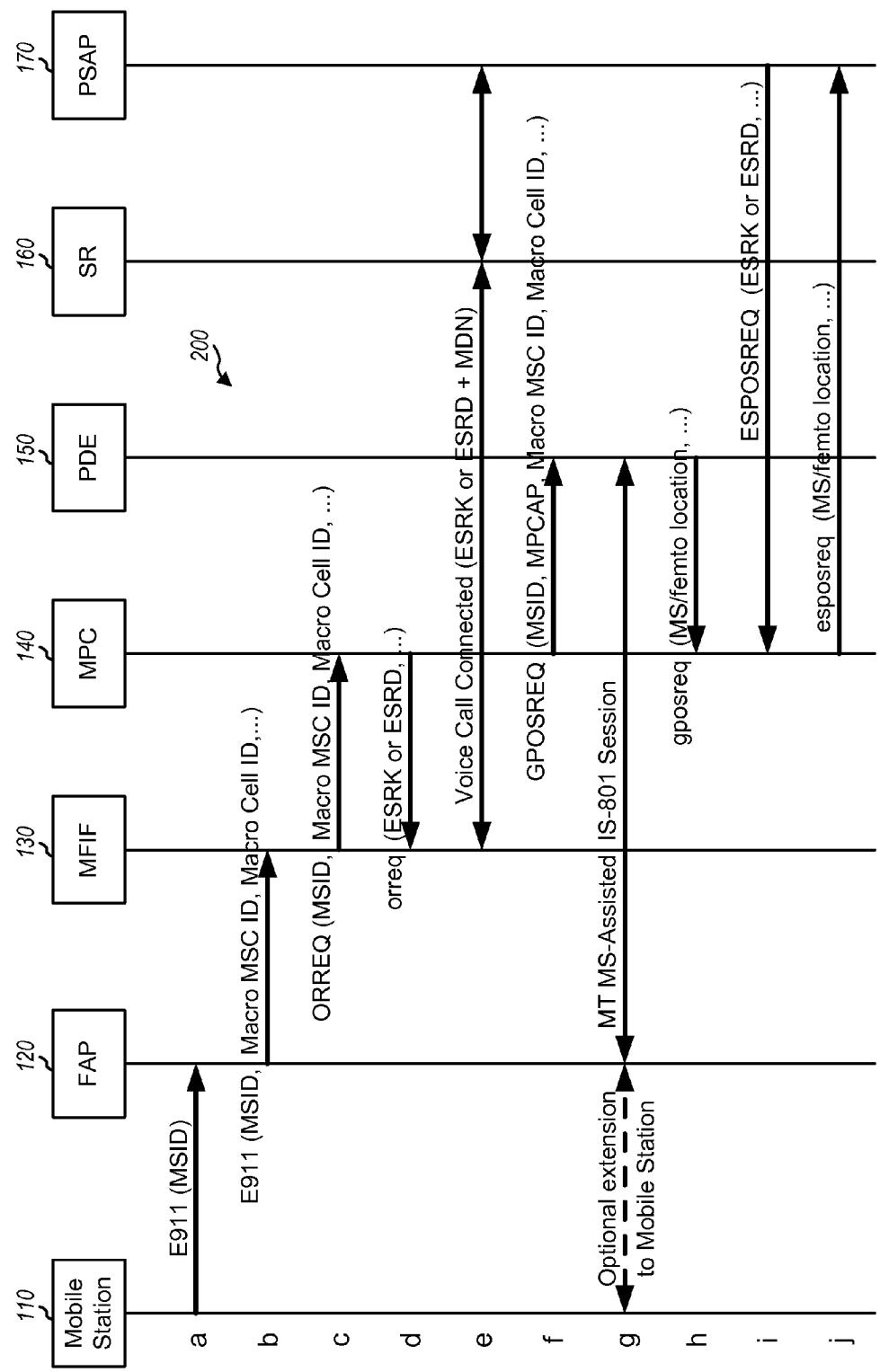
FIGS. 2, 3 and 4 illustrate three call flows for routing an emergency call from a FAP based on a macro cell ID and a macro MSC ID.

FIG. 2 shows a design of a call flow 200 for routing an emergency call from a FAP using a macro cell ID and a macro MSC ID. Initially, mobile station 110 may originate an emergency (e.g., E911) call with FAP 120 and may provide a mobile station identity (MSID) (step a). The MSID may comprise an Electronic Serial Number (ESN), an International Mobile Subscriber Identity (IMSI), a Mobile Equipment Identity (MEID), a Mobile Identification Number (MIN), and/or some other identity. FAP 120 may receive the emergency call and may send an emergency call (e.g., E911) request (e.g., in a SIP INVITE) to MFIF 130 (step b). The E911 call request may include the MSID of mobile station 110, the macro MSC ID and the macro cell ID assigned to FAP 120, etc. MFIF 130 may receive the E911 call request from FAP 120 and, in response, may send an ANSI-41 Origination Request (ORREQ) message to MPC 140 (step c). The ORREQ message may include the MSID, the macro MSC ID, and the macro cell ID received in step b.

MPC 140 may receive the ORREQ message and may look up the combination of macro MSC ID and macro cell ID in CRDB 142 and may find a PSAP (e.g., PSAP 170) and an ESRK or ESRD associated with the PSAP. PSAP 170 may be appropriate for the location of FAP 120 (and hence the location of mobile station 110) because the macro MSC ID and the macro cell ID were originally assigned to FAP 120 based on the femto location. MPC 140 may then return to MFIF 130 an Origination Response (orreq) message that may include the ESRK or ESRD (step d). MFIF 130 may then forward the emergency call to PSAP 170 based on the ESRD or ESRK and may include a Mobile Directory Number (MDN) of mobile station 110 (step e). Forwarding may occur via selective router 160, via MGW/MGCF 158 and selective router 160, via CSCF 128, MGW/MGCF 158, and selective router 160, or via other network entities.

MPC 140 may look up the positioning capabilities of mobile station 110 based on the MSID received in step c. MPC 140 may also receive the positioning capabilities of mobile station 110 from FAP 120 in step b if mobile station 110 had sent these in step a. MPC 140 may then send to PDE 150 a Geo Position Request (GPOSREQ) message that may include the positioning capabilities (MPCAP) and the MSID of mobile station 110, the macro MSC ID and the macro cell ID of FAP 120, etc. (step f).

PDE 150 may then instigate a mobile terminated (MT) IS-801 session with either FAP 120 or mobile station 110 based on the positioning capabilities received from MPC 140 (step g). IS-801 is a positioning protocol commonly used in 3GPP2 networks. IS-801 supports positioning of a target device with defined procedures and signaling between the target device and a location server (e.g., a PDE). Radio Resource LCS Protocol (RRLP), Radio Resource Control (RRC), and LTE Positioning Protocol (LPP) are positioning protocols commonly used in 3GPP networks and may also be used for positioning of FAP 120 and/or mobile station 110. FAP 120 may treat the IS-801 session based on a transparent mode, an intercept mode, or a reject mode, as described below. IS-801 messages for the IS-801 session may be transported using ANSI-41 SMS messages between MFIF 130 and PDE 150 and SIP messages (e.g., SIP INFO) between MFIF 130 and FAP 120. PDE 150 may return a location estimate for mobile station 110 or FAP 120 to MPC 140 (step h).

PSAP 170 may determine MPC 140 from the ESRK or ESRD received in step e and may send to MPC 140 an Emergency Services Position Request (ESPOSREQ) message that may include the ESRK or ESRD and the MDN (step i). MPC 140 may then return the location estimate for mobile station 110 or FAP 120 to PSAP 170 (step j). The steps in FIG. 2 may occur in different order than the order shown in FIG. 2. Furthermore, different and/or additional steps may also be used for call flow 200.

The location that is returned to PSAP 170 by MPC 140 in step j may be the location of mobile station 110 or the location of FAP 120 obtained in step g. The location of FAP 120 may be more reliable than the location of mobile station 110 because (i) FAP 120 may have been placed by the user at a location favorable to obtaining location measurements, (ii) FAP 120 may have antennas specifically designed for receiving and measuring SPS (e.g., GPS) and other signals or may be connected to an outside roof antenna on the same building, and (iii) FAP 120 may have been positioned multiple times in the past with the most accurate and reliable location being stored for subsequent use. For mobile station 110, there may be just one opportunity to obtain location (when step g is executed), which may occur when mobile station 110 may not be suitably placed for obtaining location measurements and/or satellite signals may not be strong or have good geometry. In addition, mobile station 110 may use an antenna and other internal resources that may not be ideal for location (e.g., GPS) measurements due to being shared for both location measurements and wireless communication and/or due to a bad RF environment. For these reasons, the location of FAP 120 may be more accurate and reliable than the location of mobile station 110. If the coverage area of FAP 120 is relatively small (e.g., 50 meters or less), then the location of FAP 120 may provide a good location estimate for mobile station 110, e.g., better than any location derived with measurements obtained by mobile station 110. To ensure the best possible location estimate, PDE 150 may combine both the location of mobile station 110 and the location of FAP 120, e.g., PDE 150 may use one location to validate the other location, or may average the two locations.

Figure 3:
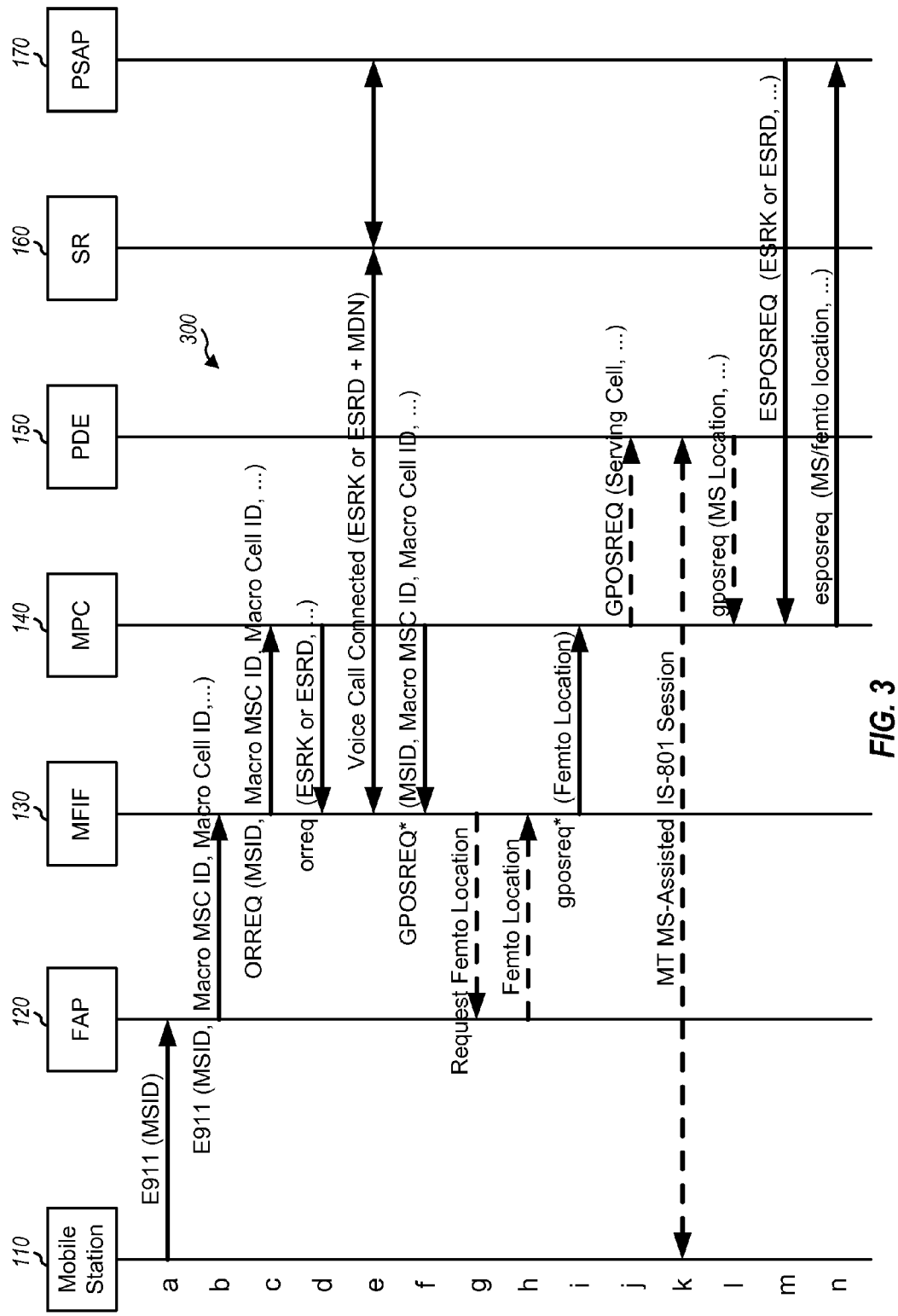

FIG. 3 shows a design of a call flow 300 for routing an emergency call from a FAP with use of ANSI-41 to obtain the femto location. Steps a through e in call flow 300 may correspond to steps a through e in call flow 200 in FIG. 2. MPC 140 may determine that the emergency call is from a FAP due to an MSC address of MFIF 130, the MSC ID of MFIF 130, or the serving cell ID of FAP 120, which are sent by MFIF 130 in step c. MPC 140 may send a GPOSREQ message to MFIF 130 to request the location of FAP 120 (step f). If MFIF 130 does not already have the femto location, then MFIF 130 may query FAP 120 for the femto location (step g), and FAP 120 may return the femto location (step h). If MFIF 130 does have the femto location, then steps g and h may be skipped. In either case, MFIF 130 may return the femto location to MPC 140 (step i). MPC 140 may instigate an IS-801 session between PDE 150 and mobile station 110 if the femto location is not available from MFIF 130 or is considered unreliable or inaccurate (steps j, k and l). Steps j, k and l in FIG. 3 may be similar to steps f, g and h in FIG. 2. Steps m and n may correspond to steps i and j, respectively, in FIG. 2. Similar to FIG. 2, the location returned to PSAP 170 in step n in FIG. 3 may be the location of FAP 120 obtained in steps f to i or the location of mobile station 110 obtained in step k or a combination of both locations.

Figure 4:
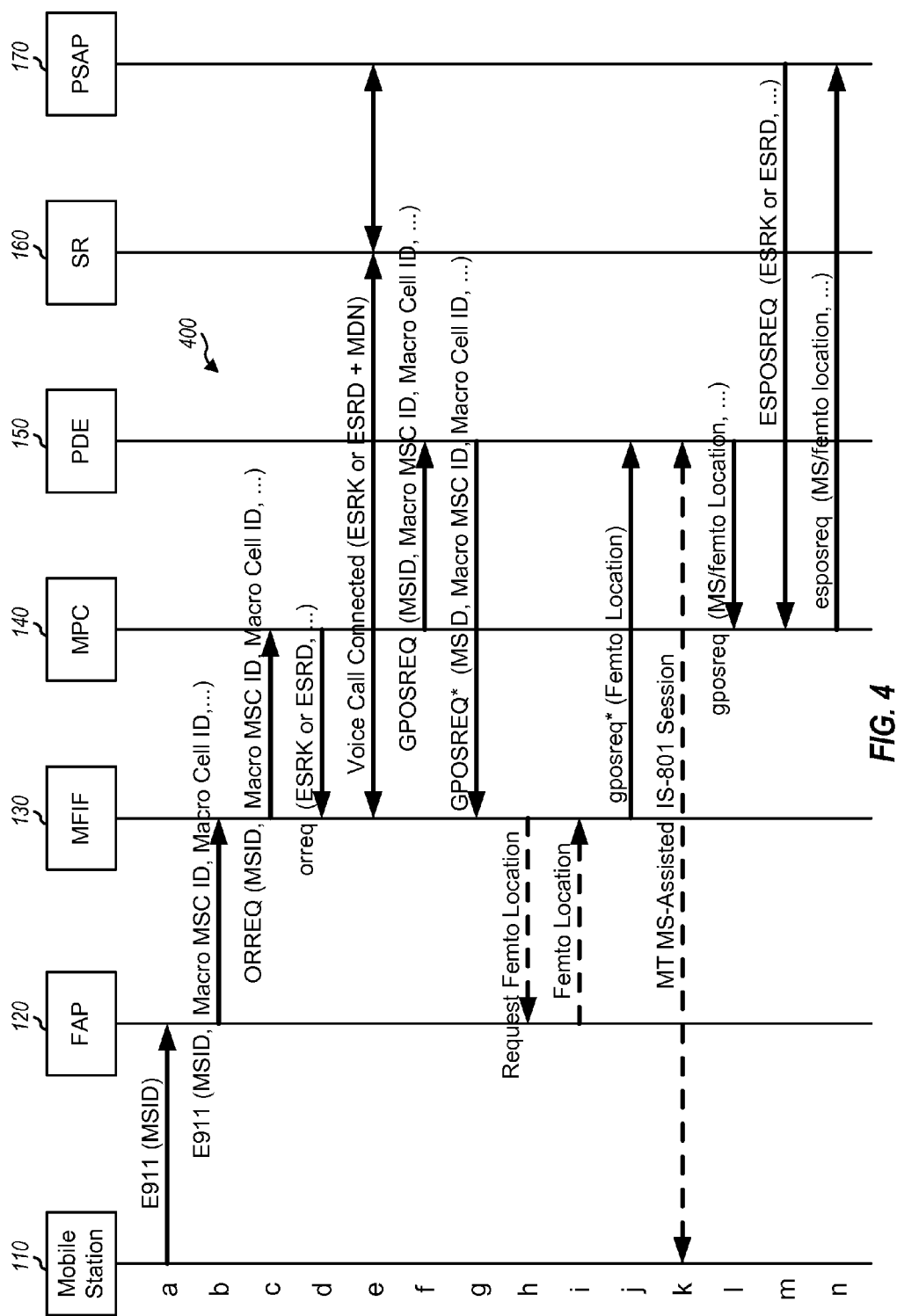

FIG. 4 shows a design of a call flow 400 for routing an emergency call from a FAP with use of ANSI-41 to obtain the femto location. Steps a through e in call flow 400 may correspond to steps a through e in call flows 200 and 300. MPC 140 may send a GPOSREQ message to PDE 150 to request the location of FAP 120 or mobile station 110 (step f). PDE 150 may determine that the emergency call is from a FAP due to an MSC address of MFIF 130, the MSC ID of MFIF 130, or the serving cell ID of FAP 120, which are sent by MFIF 130 in step c and by MPC 140 in step f. PDE 150 may then send a GPOSREQ message to MFIF 130 to request the location of FAP 120 (step g). If MFIF 130 does not already have the femto location, then MFIF 130 may query FAP 120 for the femto location (step h), and FAP 120 may return the femto location (step i). Steps h and i may be skipped if MFIF 130 already has the femto location. In either case, MFIF 130 may return the femto location to PDE 150 (step j). PDE 150 may instigate an IS-801 session with mobile station 110 if the femto location is not available from MFIF 130 or is considered unreliable or inaccurate (steps k). PDE 150 may then return the location of mobile station 110 or FAP 120 to MPC 140 (step l). Steps m and n may correspond to steps i and j, respectively, in FIG. 2.

FIGS. 3 and 4 show exemplary call flows for using the femto location as the mobile station location. FIGS. 3 and 4 also show use of ANSI-41 messages to retrieve the femto location from MFIF 130 by MPC 140 (in call flow 300) or by PDE 150 (in call flow 400). The call flows may be used for emergency call origination without handoff and when the call is subject to the following types of handoff: (i) handoff from a femto cell to a macro cell (with MFIF 130 indicating no location available to MPC 140 in step i of FIG. 3 or to PDE 150 in step j of FIG. 4, leading to a mobile terminated mobile-assisted IS-801 session in step k), and (ii) handoff from the femto cell to another femto cell (again relying on the IS-801 session in step k). For handoff from a macro cell to a femto cell, the call flow in FIG. 4, for example, may be used without steps g, h, i and j since MPC 140 and PDE 150 will not be aware of MFIF 130.

In the exemplary design shown in FIG. 2, PDE 150 may initiate a mobile-terminated IS-801 session (in step g) for an emergency call from FAP 120. In one design, FAP 120 may treat the IS-801 session based on one of the following modes.

In a transparent mode, FAP 120 may transfer all IS-801 messages to and from mobile station 110 without interpretation or alteration. In this case, an IS-801 message sent by PDE 150 is transferred first to MFIF 130, then to FAP 120 and finally to mobile station 110. Similarly an IS-801 message sent by mobile station 110 is transferred through these entities in the opposite direction to reach PDE 150. MFIF 130 may mark IS-801 messages in a particular way prior to forwarding the messages to FAP 120 such that FAP 120 can recognize the IS-801 messages without actually looking inside the messages. PDE 150 may obtain a location estimate of mobile station 110 by instigating positioning (e.g., AFLT or A-GPS) in mobile station 110 using these IS-801 messages to convey and receive the positioning related instructions and responses.

In an intercept mode, FAP 120 may intercept all IS-801 messages received from PDE 150 (via MFIF 130) and may perform positioning as if it were mobile station 110 and may return IS-801 response messages back to PDE 150 (via MFIF 130). In case of handoff, FAP 120 may first terminate an ongoing IS-801 session. Another IS-801 session may then be started by PDE 150 either with mobile station 110 or with a new FAP in order to obtain the new location of mobile station 110.

In a reject mode, FAP 120 may discard the first IS-801 message received from PDE 150 and may return an IS-801 Reject message or another IS-801 message with a special reason code indicating a FAP. The Reject or other message may also carry the femto location. FAP 120 may subsequently behave as in the transparent mode and may forward subsequent IS-801 messages between PDE 150 and mobile station 110. The reject mode may be used to provide the femto location to PDE 150. The femto location may be used for the mobile station location and may be sufficient.

During initialization, FAP 120 may treat an IS-801 session in accordance with one of the modes described above. FAP 120 may select a mode based on various factors such as its location (e.g., urban, rural, or suburban), its positioning and IS-801 capabilities, etc. Alternatively, the mode may be configured in FAP 120 at initialization and/or may be configured or changed at any time using OAM&P 134, for example.

Mobile station 110 may originate an emergency call with a base station or another FAP, and the emergency call may be handed over to FAP 120. In one design, FAP 120 may forward all IS-801 messages received from mobile station 110 toward PDE 150 via MFIF 130, e.g., in order to support any IS-801 session started before the handoff. In one design, FAP 120 may (i) forward all IS-801 messages received from PDE 150 (via MFIF 130) to mobile station 110 or (ii) reject the initial IS-801 message and forward subsequent IS-801 messages.

In a second scheme for routing an emergency call based on femto location, a geographic CRDB may be used to determine a suitable PSAP. The geographic CRDB may also be used to improve routing for emergency calls from base stations via interim positioning (which is an option in J-STD-036) without much additional impact.

PSAP selection may occur either (a) when the location of FAP 120 is first determined, e.g., at initialization, or (b) when the emergency call is placed. Option (b) may be used because it is already defined as an option in J-STD-036B, uses signaling that is already defined, avoids the need to complicate femto initialization, and enables operator control of PSAP routing. Option (b) may also allow the femto location to be verified at the time of the emergency call, which may be pertinent for cases in which (i) the initial femto location was not very accurate or not reliable or (ii) FAP 120 has been moved to a new location.

Figure 5:
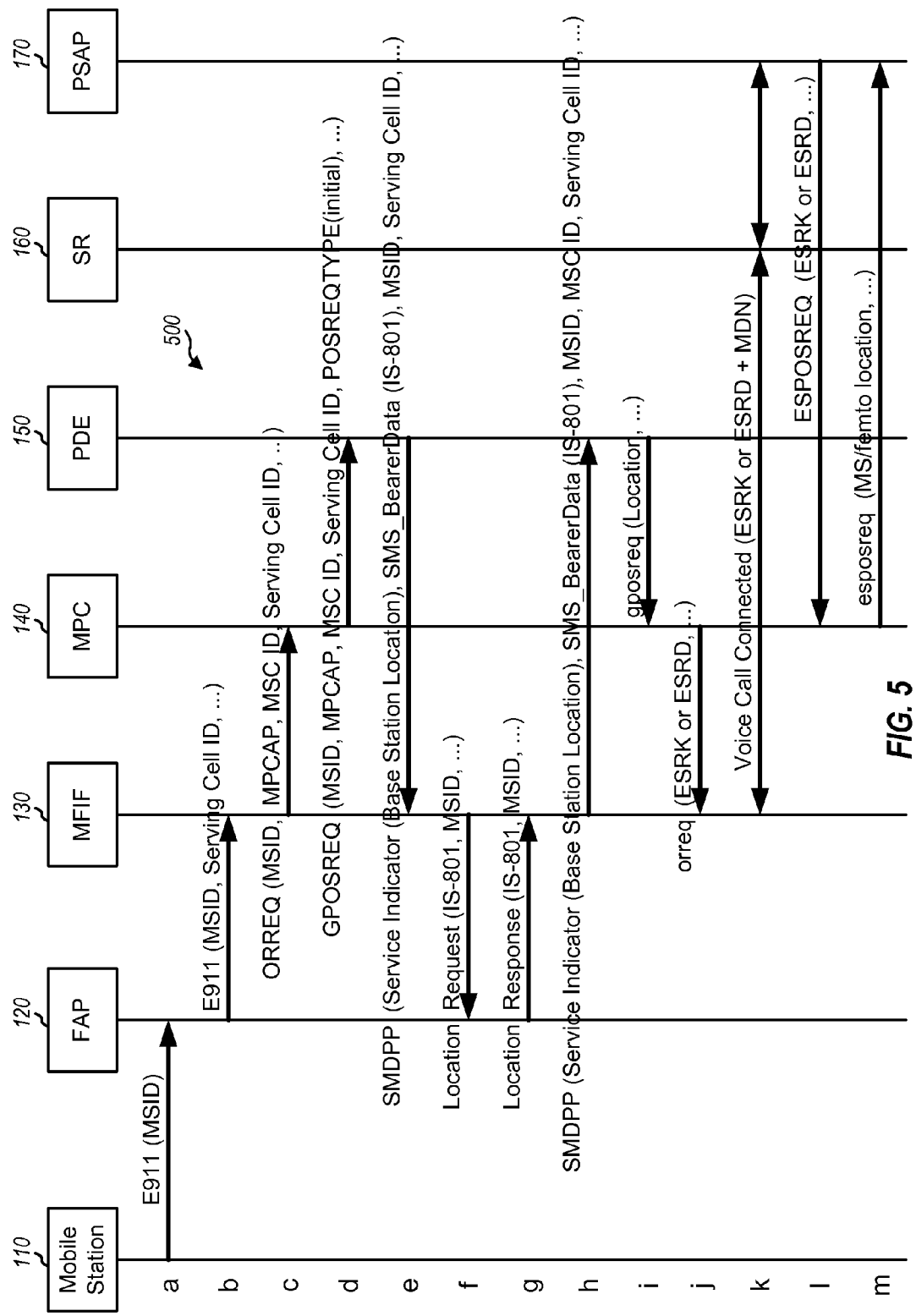
FIGS. 5 and 6 illustrate two call flows for routing an emergency call from a FAP using a geographic database.

FIG. 5 shows a design of a call flow 500 for routing an emergency call from a FAP using a geographic CRDB. Mobile station 110 may originate an emergency call with FAP 120 (step a). FAP 120 may forward to MFIF 130 an emergency call request (e.g., in a SIP INVITE) that may include the MSID of mobile station 110, the serving cell ID of FAP 120, and the positioning capabilities of mobile station 110 and/or FAP 120, etc. (step b).

MFIF 130 may then send to MPC 140 an ORREQ message that may include the MSID and position capabilities (MPCAP) of mobile station 110, the serving cell ID of FAP 120, the MSC ID of MFIF 130, etc. (step c). MPC 140 may determine that the call is from a FAP, for example, by recognizing the MFIF MSC ID or by querying the serving cell ID in CRDB 142. MPC 140 may then send to PDE 150 a GPOSREQ message that may include the MSID, the MPCAP, the MFIF MSC ID, the serving cell ID, and an indication that an initial position is requested (step d).

PDE 150 may determine that the call is from a FAP, for example, by recognizing the MFIF MSC ID or by querying the serving cell ID in BSA 152. If the serving cell ID is found in BSA 152 and the associated location is considered reliable (e.g., was updated in BSA 152 recently due to a previous femto location request), then PDE 150 may proceed to step i. Otherwise, PDE 150 may send to MFIF 130 an SMS Delivery Point to Point (SMDPP) message that may include an IS-801 Position Determination Data Message (PDDM), the MSID, and the serving cell ID (step e). The IS-801 PDDM may request the already known femto location. PDE 150 may also indicate "Base Station Location" in a Service Indicator parameter using a new ANSI-41 value to inform MFIF 130 that the IS-801 PDDM is intended for FAP 120 and not for mobile station 110.

MFIF 130 may recognize the ANSI-41 "Base Station Location" value for the Service Indicator. In response, MFIF 130 may send to FAP 120 a Location Request message that may include the contents of the SMDPP message received from PDE 150 (step f). MFIF 130 may determine FAP 120 from the serving cell ID or the MSID received in the SMDPP message. FAP 120 may then return to MFIF 130 a Location Response that may include the MSID, the serving cell ID, and an IS-801 PDDM response (step g). If FAP 120 does not support IS-801 except for a minimal response, then it may return a standard (fixed format) IS-801 unsolicited PDDM response that may include the known femto location. If FAP 120 does support IS-801, then it may return a more correct IS-801 response that may include its known location or equivalent information, e.g., measurements from which PDE 150 can determine the femto location. The femto location may comprise precise coordinates of the location of FAP 120 and the uncertainty of these coordinates. The uncertainty may be modified (e.g., by FAP 120) to include the coverage area of FAP 120 and may thus indicate the possible location of mobile station 110. Steps f and g may be skipped if MFIF 130 already has the femto location.

MFIF 130 may send to PDE 150 an SMDPP message that may include the response from FAP 120 (step h). PDE 150 may instigate additional steps similar to steps e to h if the femto location was not provided in step h but FAP 120 supports IS-801. For example, PDE 150 may invoke AFLT using IS-801 to obtain the femto location. PDE 150 may then return the femto location to MPC 140 (step i). MPC 140 may update BSA 152 with the femto location for use in a subsequent location request. MPC 140 may access CRDB 142 to determine the correct PSAP (e.g., PSAP 170) for the femto location received from PDE 150. MPC 140 may assign an ESRK or may determine the ESRD for selected PSAP 170. MPC 140 may then send the ESRK or ESRD to MFIF 130 (step j). MFIF 130 may route the call to PSAP 170 based on the ESRD or ESRK (step k). PSAP 170 may determine MPC 140 from the ESRK or ESRD and may send to MPC 140 an ESPOSREQ message that may include the ESRK or ESRD and the MDN (step l). MPC 140 may determine that the femto location received in step i is sufficiently accurate as the initial mobile station location and may return the femto location to PSAP 170 (step m).

Figure 6:
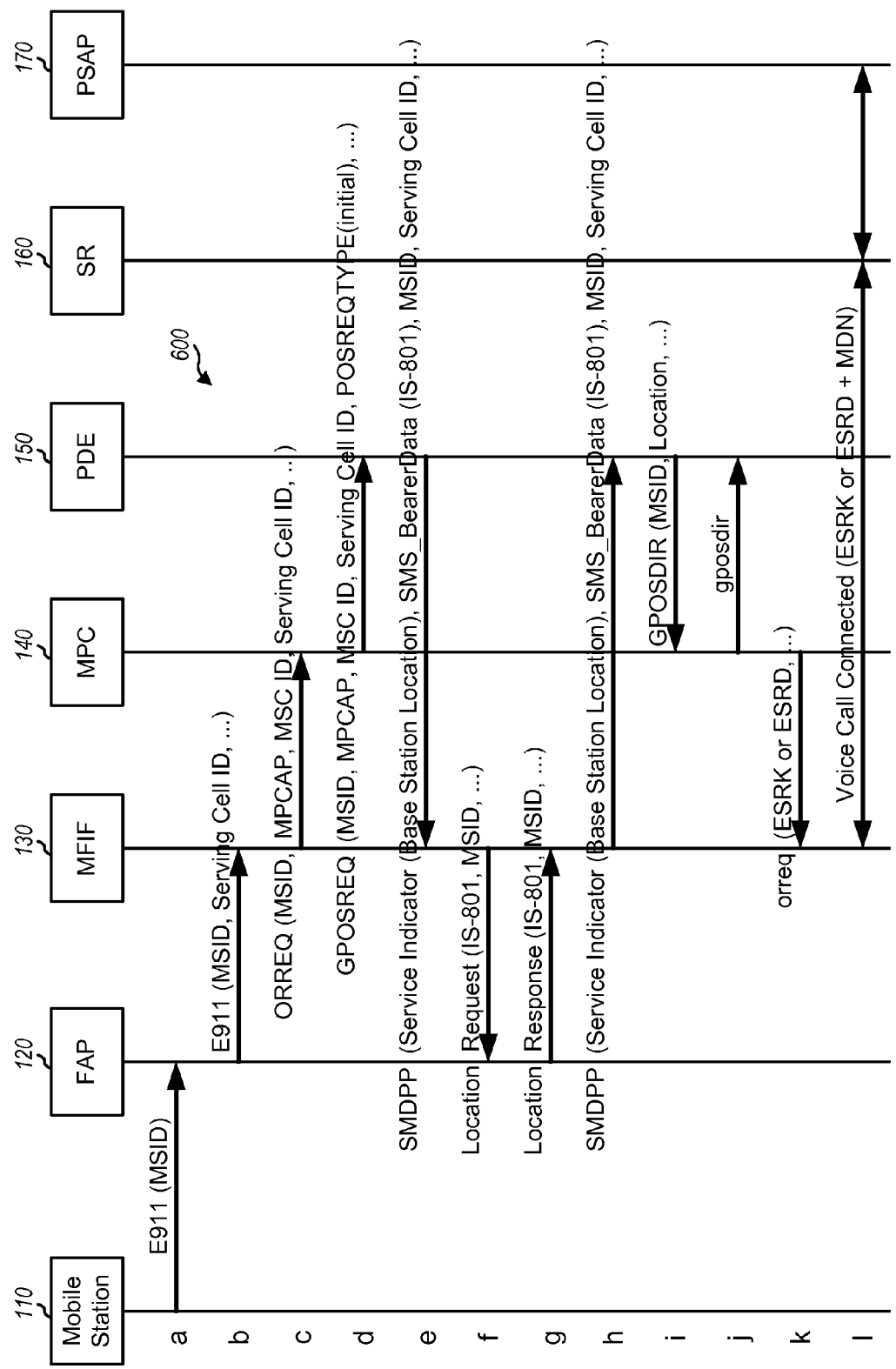
Figure 6:
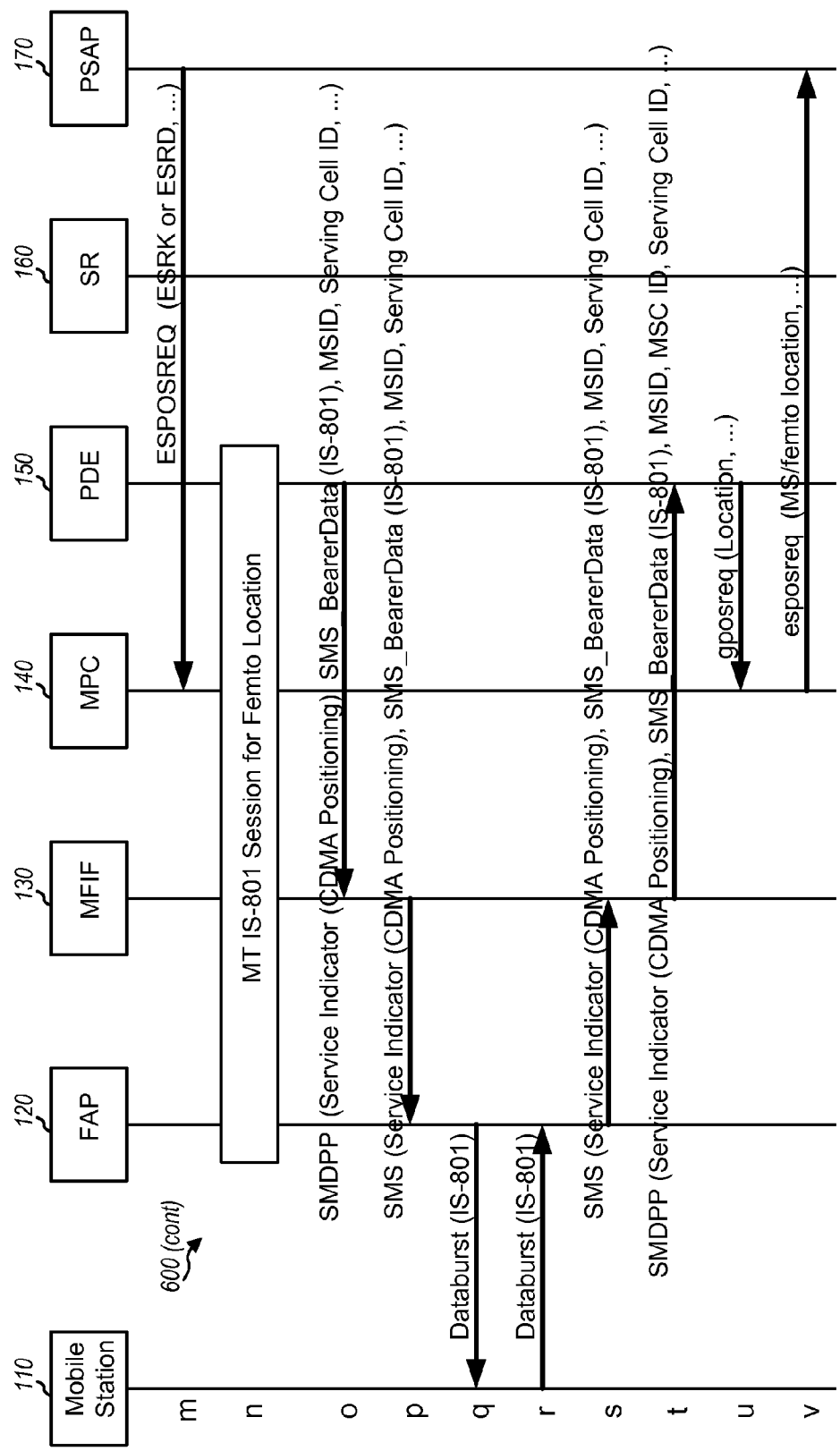

FIG. 6 shows another design of a call flow 600 for routing an emergency call from a FAP using a geographic CRDB. Steps a through h in call flow 600 correspond to steps a through h in call flow 500 in FIG. 5. After step h, PDE 150 may instigate additional steps similar to steps e to h if the femto location was not provided in step h but FAP 120 supports IS-801. For example, PDE 150 may invoke AFLT using IS-801 to obtain an approximate femto location. If the femto location is accurate enough for routing but not for emergency call dispatch, then PDE 150 may return the femto location in a Geo Position Directive (GPOSDIR) message to MPC 140, as defined in J-STD-036B for support of interim location (step i). PDE 150 may also update BSA 152 with the femto location for use in a subsequent location request. MPC 140 may acknowledge the GPOSDIR message (step j).

Steps k to m in call flow 600 correspond to steps j to l in call flow 500. In step n, if FAP 120 supports IS-801, then PDE 150 may instigate steps similar to steps e to h for a new IS-801 session to obtain an accurate location of FAP 120, e.g., using A-GPS and/or AFLT. If the resultant femto location is sufficiently accurate, then PDE 150 may skip steps o to t and may proceed to step u. If steps o to t are performed, then they may occur after step n, before step n, in parallel to step n, or instead of step n.

If step n was not performed, or if the resultant femto location was not sufficiently accurate, or if PDE 150 needs to obtain the locations of both FAP 120 and mobile station 110, then PDE 150 may instigate an IS-801 session with mobile station 110 based on the MS positioning capabilities received from MPC 140 in step d. PDE 150 may begin by sending to MFIF 130 an SMDPP message that may include an IS-801 message, the MSID, the serving cell ID, and a Service Indicator indicating CDMA Positioning as defined in J-STD-036B (step o).

MFIF 130 may recognize the CDMA Positioning value for the Service Indicator.

MFIF 130 may verify that mobile station 110 is still served by FAP 120. If that is not the case (e.g., due to handoff), then MFIF 130 may forward the SMS message to a new FAP served by MFIF 130, a new serving MSC, or a new serving MFIF, depending on where the emergency call was forwarded as a result of handoff. If the call has not been forwarded due to handoff, then MFIF 130 may send to FAP 120 an SMS message that may include the contents of the SMDPP message (step p). FAP 120 may forward the IS-801 message received from MFIF 130 in a 1× Databurst message to mobile station 110 (step q) and may be aware of the IS-801 message significance. Mobile station 110 may perform any positioning method that may have been requested in the IS-801 message and may return an IS-801 response in a 1× Databurst message to FAP 120 (step r). The IS-801 response may include any positioning measurements or positioning related information that may have been requested by PDE 150 and may include a request for information and assistance data from PDE 150. FAP 120 may forward the IS-801 message with the MSID and the serving cell ID to MFIF 130 inside an SMS message (step s).

MFIF 130 may send to PDE 150 an SMDPP message that may include the forwarded IS-801 message, the MSID, the serving cell ID, the MFIF MSC ID, and a Service Indicator indicating CDMA Positioning (step t). PDE 150 may instigate additional steps, for example, similar to steps o to q to request more information and/or more measurements from mobile station 110 using IS-801. Mobile station 110 may instigate steps similar to steps r to t to provide further measurements and/or information to PDE 150 and/or to request further information (e.g., assistance data) from PDE 150 using IS-801.

Once steps n to t are completed, PDE 150 may determine the mobile station location using any location results obtained for mobile station 110 in steps o to t and/or any location obtained for FAP 120 in step n and/or steps e to h. For example, the femto location obtained in step n and/or in steps e to h may be used to help validate the mobile station location obtained in steps o to t, or vice versa. In addition, the various location results may be combined, e.g., averaged. PDE 150 may send the mobile station location in a gposreq message to MPC 140 (step u). MPC 140 may send the mobile station location to PSAP 170 (step v).

The location procedures in the call flows in FIGS. 2 through 6 may be applicable for various handoff scenarios. For a femto to macro handoff, mobile station 110 may originate an emergency call with FAP 120, and the emergency call may be handed off to a base station. PDE 150 may still obtain the location of FAP 120 and may use the femto location for both routing and as an initial location for dispatch. PDE 150 may obtain the location of mobile station 110 rather than FAP 120 for any request for updated location in order to avoid errors following handoff. An IS-801 session may be pending when the handoff occurs or may be initiated after the handoff. In this case, IS-801 messages from PDE 150 may be forwarded from MFIF 130 to a serving MSC inside ANSI-41 SMDFWD messages. Mobile station 110 can receive the IS-801 messages and continue the IS-801 session with PDE 150.

For a macro to femto handoff, mobile station 110 may originate an emergency call with a base station, and the emergency call may be routed using the serving cell ID of the base station. PDE 150 may instigate an IS-801 session with mobile station 110 to obtain an accurate initial location and any updated location. The emergency call may be handed off to FAP 120. PDE 150 may not be able to obtain the location of the new FAP 120, e.g., for use as the mobile station location. An IS-801 session may be pending when the handoff occurs or may be needed after the handoff. In this case, IS-801 messages from PDE 150 may be forwarded from an anchor MSC for the base station to MFIF 130, which may forward these messages to FAP 120. FAP 120 can then pass the messages to mobile station 110. FAP 120 can also return all IS-801 responses to PDE 150 sent by mobile station 110.

For femto to femto handoff, mobile station 110 may originate an emergency call with FAP 120, and PDE 150 may obtain the location of FAP 120 and may use the femto location for both routing and as an initial location for dispatch. The emergency call may be handed off to a new FAP. PDE 150 may always obtain the location of mobile station 110 rather than any FAP for any request for updated location in order to avoid errors following handoff that might arise with this type of handoff. An IS-801 session may be pending when the handoff occurs or may be initiated after the handoff. In this case, IS-801 messages may be transferred from PDE 150 to the new FAP via MFIF 130 (if the MFIF has not changed) or via MFIF 130 and a serving MFIF (if the new FAP uses a different MFIF). The new FAP may treat IS-801 messages, e.g., in similar manner as for macro to femto handoff.

In another aspect, FAP 120 may perform positioning using IS-801 at initialization and/or at periodic intervals. An initial location of FAP 120 may be obtained in association with OAM&P 134 as part of femto authorization following power on and authentication, e.g., to ensure that FAP 120 is located in a licensed operator area. The location of FAP 120 may be updated at periodic intervals or when needed to improve accuracy and to detect any movement of FAP 120.

The initial and updated location of FAP 120 may be obtained using one or more of the following:

- An SPS receiver in FAP 120 that employs, for example, standalone SPS positioning,
- Observed macro cells/base stations and/or femto cells/access points whose locations are known by OAM&P 134,
- Subscription address for a mobile station or a user,
- Public IP address assigned to FAP 120 by an service provider,
- A location or an address entered by the user on FAP 120, and
- A MT IS-801 session, e.g., with A-GPS and/or AFLT positioning in FAP 120.

Figure 7:
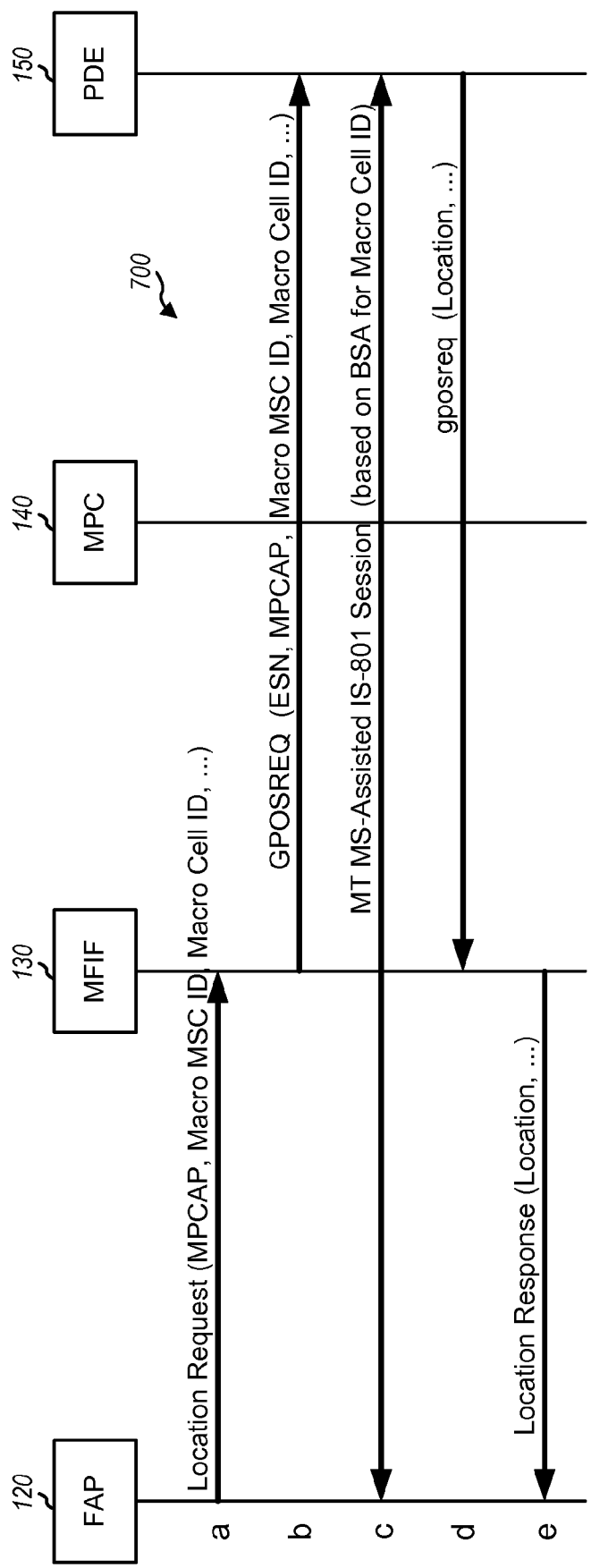
FIGS. 7 and 8 illustrate two call flows for obtaining femto location using IS-801.

FIG. 7 shows a design of a call flow 700 for obtaining femto location using IS-801. Call flow 700 may be used for the first scheme associated with FIGS. 2, 3 and 4. FAP 120 may send a location request to MFIF 130 and may provide its IS-801 location capabilities (MPCAP), the macro MSC ID, the macro cell ID, etc. (step a). The location capabilities may be A-FLT, A-GPS, etc. If the initial location of FAP 120 is not yet obtained and if FAP 120 is unable to observe signals from any surrounding macro cells, then FAP 120 may not provide a macro MSC ID and a macro cell ID. In this case, a default macro MSC ID and a default macro cell ID may be assigned temporarily by OAM&P 134 or MFIF 130. This macro MSC ID and macro cell ID may or may not be provisioned in CRDB 142 and BSA 152. In any case, MFIF 130 may emulate an MPC and may send to PDE 150 a GPOSREQ message that may include the MPCAP, the macro MSC ID, and the macro cell ID (step b). The GPOSREQ message may also include a special MSID (e.g., a fixed ESN) to indicate a FAP.

PDE 150 may receive the GPOSREQ message and may recognize the special MSID indicating a FAP. If the macro MSC ID and the macro cell ID are found in BSA 152, then PDE 150 may instigate an IS-801 session to invoke a suitable positioning method (e.g., AFLT and/or A-GPS) to position FAP 120 (step c). If the macro MSC ID and the macro cell ID are not found in BSA 152, then PDE 150 may initially invoke AFLT without providing any assistance data to obtain information about neighboring macro cells and may then use one or more of these macro cells to support an IS-801 session. Alternatively, e.g., if no macro cells are detected, then PDE 150 may provide A-GPS assistance data based on a rough guess of the femto location (e.g., based on a known serving area of MFIF 130). A-GPS positioning may take longer due to this less precise A-GPS assistance data. During this IS-801 session, PDE 150 may treat FAP 120 in similar manner as a mobile station in terms of providing assistance data to FAP 120 and requesting measurements from FAP 120. Thus, from an IS-801 perspective, PDE 150 may retain the normal role of an IS-801 PDE while FAP 120 may take on the role of a mobile station.

After completing the IS-801 session, PDE 150 may return a location estimate for FAP 120 to MFIF 130 (step d). PDE 150 may encrypt and/or digitally sign the location estimate using a cryptographic key known to OAM&P 134 but not known to FAP 120 and possibly using other information such as the current date and time, the MEID of FAP 120, etc. The encryption and/or digital signature may prevent spoofing of the femto location. MFIF 130 may return the location estimate to FAP 120 (step e). FAP 120 may then provide the location estimate to OAM&P 134. If the location estimate was encrypted and/or digitally signed, then OAM&P 134 can decrypt it and/or authenticate it and thereby verify that the location was obtained by PDE 150. Furthermore, for later provision of a location estimate to a new PDE for an emergency call (e.g., as part of an IS-801 Reject message from FAP 120), the original encrypted and/or digitally signed location may be used to enable the new PDE to authenticate it.

Figure 8:
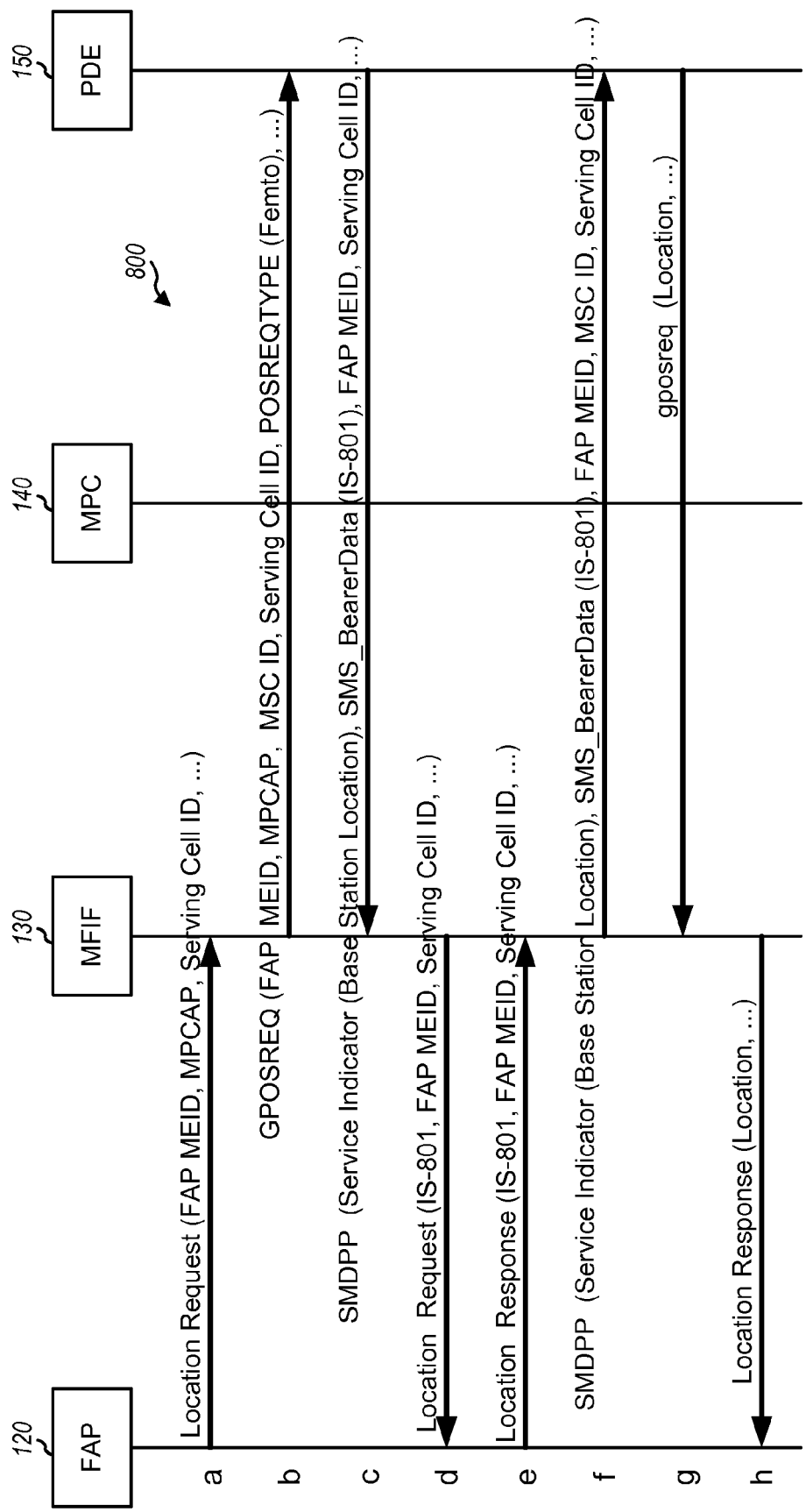

FIG. 8 shows a design of a call flow 800 for obtaining femto location using IS-801. Call flow 800 may be used for the second scheme associated with FIGS. 5 and 6. FAP 120 may send a location request to MFIF 130 and may provide its IS-801 location capabilities (MPCAP), its MEID, its serving cell ID, etc. (step a). MFIF 130 may emulate an MPC and may send to PDE 150 a GPOSREQ message that may include the MSC ID of MFIF 130, the MPCAP, MEID, and serving cell ID of FAP 120, etc. (step b). The GPOSREQ message may also include a Position Request Type parameter set to a value to indicate request for femto location.

PDE 150 may receive the GPOSREQ message and may recognize the Position Request Type value. PDE 150 may instigate an IS-801 session with FAP 120 by sending to MFIF 130 an SMDPP message that may include an IS-801 PDDM, the MEID and the serving cell ID of FAP 120, etc. (step c). The IS-801 PDDM may instigate, for example, AFLT and/or A-GPS positioning. PDE 150 may also indicate "Base Station Location" in a Service Indicator.

MFIF 130 may receive the SMDPP message and may recognize the "Base Station Location" value for the Service Indicator. MFIF 130 may determine FAP 120 from the serving cell ID or MEID in the SMDPP message. MFIF 130 may send to FAP 120 a Location Request message that may include the contents of the SMDPP message (step d). FAP 120 may obtain positioning measurements as requested by PDE 150 and may send to MFIF 130 a Location Response that may include an IS-801 response, the MEID and the serving cell ID of FAP 120, etc. (step e). The IS-801 response may include positioning measurements and/or positioning related information requested by PDE 150. MFIF 130 may forward the IS-801 response in an SMDPP message to PDE 150 (step f). PDE 150 may treat FAP 120 in similar manner as a mobile station with respect to the IS-801 session.

PDE 150 may instigate additional steps similar to steps c and d to request more information and/or measurements from FAP 120 using IS-801. FAP 120 may instigate additional steps similar to steps e and f to provide additional measurements and/or information to PDE 150 and/or to request information (e.g., assistance data) from PDE 150 using IS-801. PDE 150 may then return the calculated femto location to MFIF 130 (step g). The location estimate may be encrypted and/or digitally signed by PDE 150 or may be sent unciphered and unsigned. PDE 150 may update BSA 152 with the femto location for use in a subsequent location request. MFIF 130 may return the location estimate to FAP 120 (step h). FAP 120 may provide the location estimate to OAM&P 134.

As described above for FIG. 2, the location of FAP 120 obtained according to FIGS. 7 and 8 may be accurate and reliable. In particular, PDE 150 may provide assistance data to FAP 120 (e.g., for A-GPS, A-SPS, or AFLT positioning) in either FIG. 7 or 8 to improve this accuracy and reliability. The IS-801 procedure and the assistance data provided may be similar to when PDE 150 is positioning a mobile station (e.g., mobile station 110). However, a more reliable and accurate location may be obtained for FAP 120 than for a mobile station due to the reasons noted above.

FIGS. 2 through 8 show exemplary call flows illustrating various features of the techniques described herein. The techniques may also be implemented with other call flows, which may have different steps than those shown in FIGS. 2 through 8.

Figures 9, 10:
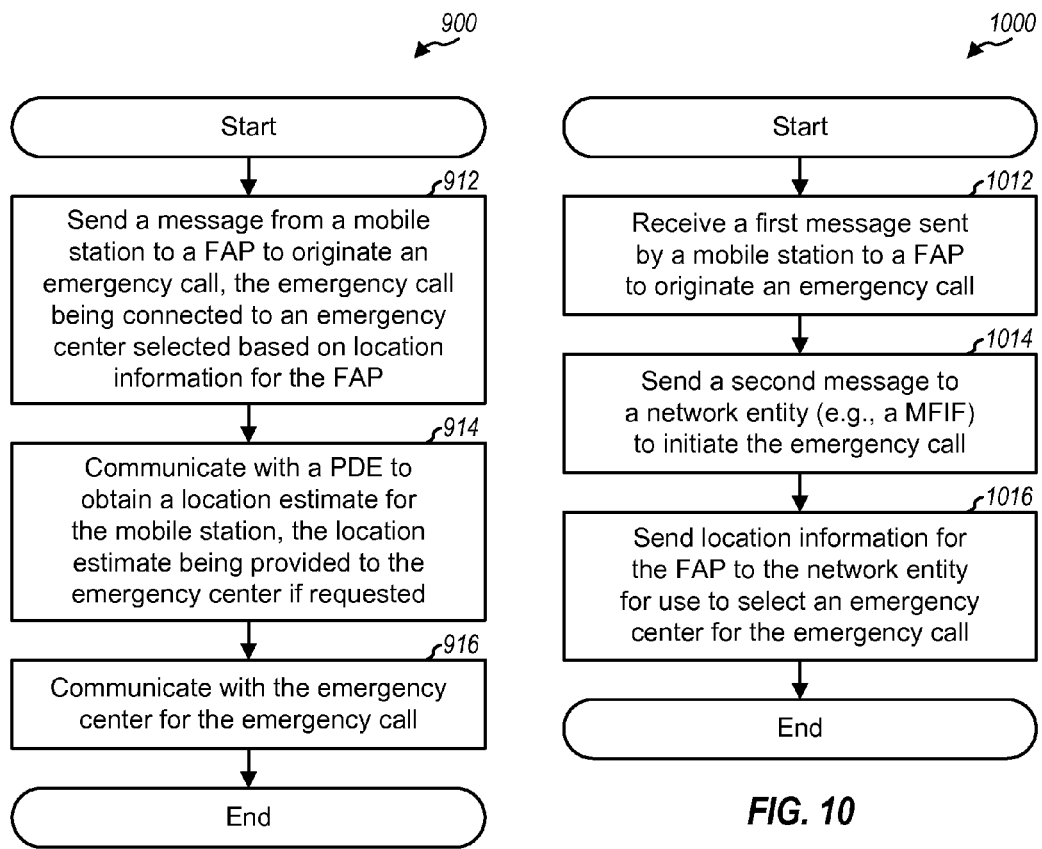
FIGS. 9 to 12 illustrate processes performed by different entities for an emergency call.

FIG. 9 shows a design of a process 900 performed by a mobile station. The mobile station may send a message to a FAP to originate an emergency call, e.g., in step a in FIGS. 2 to 6 (block 912). The emergency call may be connected to an emergency center (e.g., a PSAP) selected based on location information for the FAP. The mobile station may communicate with a PDE to obtain a location estimate for the mobile station, e.g., in step g in FIG. 2, or step k in FIGS. 3 and 4 (block 914). The location estimate may be provided to the emergency center if requested. The mobile station may communicate with the emergency center for the emergency call (block 916).

FIG. 10 shows a design of a process 1000 performed by a FAP to support emergency calls. The FAP may receive a first message sent by a mobile station to originate an emergency call, e.g., in step a in FIGS. 2 to 6 (block 1012). The FAP may send a second message to a MFIF (or some other network entity) to initiate the emergency call, e.g., in step b in FIGS. 2 to 6 (block 1014). The FAP may also send location information for the FAP to the MFIF (or some other network entity) for use to select an emergency center for the emergency call, e.g., in step g in FIGS. 5 and 6 (block 1016).

In one design, the FAP may determine its location during initialization and may obtain the location information determined based on its location. In one design, the FAP may communicate with a PDE to obtain a location estimate for itself during initialization, and the location information may comprise the location estimate. In another design, the location information may comprise a macro cell ID, which may be determined based on the location of the FAP. For example, the macro cell ID may be for a macro cell having a strong received signal at the FAP or having overlapping coverage with the FAP. The location information may further comprise a macro MSC ID, which may be determined based on the macro cell ID. The location information may also comprise other types of information determined based on the location of the FAP.

In one design, the FAP may send the location information in the second message in block 1014. In another design, the FAP may receive a request for location of the FAP from the MFIF, e.g., in step f in FIGS. 5 and 6. The FAP may then send the location information to the MFIF in response to the request, e.g., in step g in FIGS. 5 and 6. The FAP may thus send the location information in the initial message sent to the MFIF in a subsequent message sent to the MFIF.

In one design, the FAP may communicate with a PDE to obtain a location estimate for itself after the emergency call is originated, e.g., in step g in FIG. 2. The location estimate for the FAP may be used as a location estimate for the mobile station and may be provided to the emergency center if requested. In one design, the FAP may receive a request for location of the FAP from the network entity and may send a location estimate for itself to the network entity, e.g., in steps g and h in FIG. 3, or steps h and i in FIG. 4. In one design, the FAP may forward messages exchanged between the mobile station and the PDE to obtain a location estimate for the mobile station after the emergency call is originated. The location estimate for the mobile station may be provided to the emergency center if requested. The FAP may support positioning for itself and/or for the mobile station in other manners, as described above.

Figure 11:
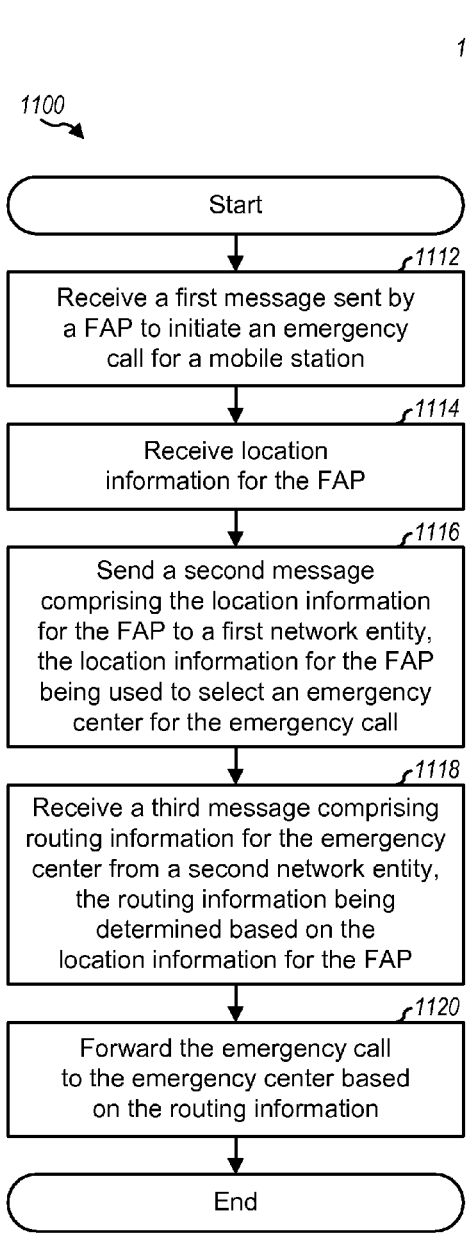

FIG. 11 shows a design of a process 1100 performed by a MFIF to support emergency calls. The MFIF may receive a first message sent by a FAP to initiate an emergency call for a mobile station, e.g., in step b in FIGS. 2 to 6 (block 1112). The MFIF may also receive location information for the FAP, e.g., in step b in FIGS. 2 to 4 or step g in FIGS. 5 and 6 (block 1114). The MFIF may send a second message comprising the location information for the FAP to a first network entity (e.g., an MPC or a PDE), e.g., in step c in FIGS. 2 to 4 or step h in FIGS. 5 and 6 (block 1116). The location information for the FAP may comprise a macro cell ID and possibly a macro MSC ID determined based on the location of the FAP, a location estimate for the FAP, and/or other information determined based on the location of the FAP. The location information for the FAP may be included in the first message sent by the FAP (e.g., as shown in FIGS. 2 to 4) or may be sent by the FAP in response to a request for location of the FAP (e.g., as shown in FIGS. 5 and 6). In any case, the location information for the FAP may be used to select an emergency center for the emergency call.

The MFIF may receive a third message comprising routing information for the emergency center from a second network entity (e.g., the MPC), e.g., in step d in FIGS. 2 to 4, step j in FIG. 5, or step k in FIG. 6 (block 1118). The first and second network entities may be the same or different network entities. The routing information may be determined based on the location information for the FAP and may comprise an ERSK, an ERSD, and/or other information. The MFIF may forward the emergency call to the emergency center based on the routing information, e.g., in step e in FIGS. 2 to 4, step k in FIG. 5, or step l in FIG. 6 (block 1120).

The MFIF may receive a request for location of the FAP from the first or second network entity, e.g., in step f in FIG. 3 or step g in FIG. 4. The MFIF may provide the location of the FAP to the first or second network entity, if available, without querying the FAP, e.g., in step i in FIG. 3 or step j in FIG. 4. The MFIF may also support positioning of the FAP and/or the mobile station.

Figure 12:
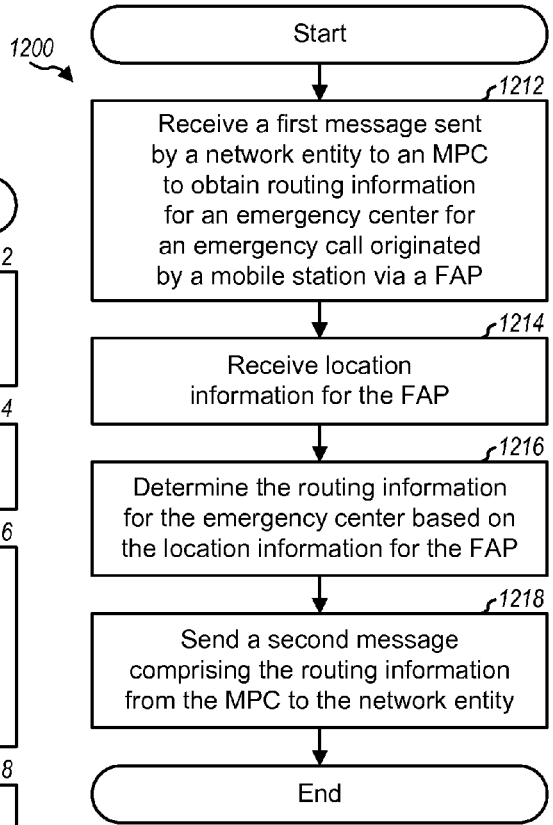

FIG. 12 shows a design of a process 1200 performed by an MPC to support emergency calls. The MPC may receive a first message sent by a MFIF (or some other network entity) to obtain routing information for an emergency center for an emergency call originated by a mobile station via a FAP, e.g., in step c in FIGS. 2 to 6 (block 1212). The MPC may also receive location information for the FAP, e.g., in step c in FIGS. 2 to 4, or step i in FIGS. 5 and 6 (block 1214). The MPC may determine the routing information for the emergency center based on the location information for the FAP (block 1216). The MPC may then send a second message comprising the routing information to the MFIF (or some other network entity), e.g., in step d in FIGS. 2 to 4, step j in FIG. 5, or step k in FIG. 6 (block 1218).

In one design, the location information for the FAP may comprise a macro cell ID and possibly a macro MSC ID determined based on the location of the FAP. The MPC may determine the routing information by looking up the macro cell ID and possibly the macro MSC ID in a database of routing information for different cell IDs, e.g., a conventional CRBD. In another design, the location information for the FAP may comprise a location estimate for the FAP. The MPC may determine the routing information by looking up a database of routing information for different geographic areas, e.g., a geographic CRBD.

In one design, the MPC may receive a location estimate for the FAP. The MPC may thereafter receive a request for location of the mobile station from the emergency center, e.g., in step i in FIG. 2, step m in FIGS. 3 and 4, step l in FIG. 5, or step m in FIG. 6. The MPC may then send the location estimate for the FAP to the emergency center. Alternatively, the MPC may initiate positioning to obtain a location estimate for the mobile station and may then send the location estimate to the emergency center.

Figure 13:
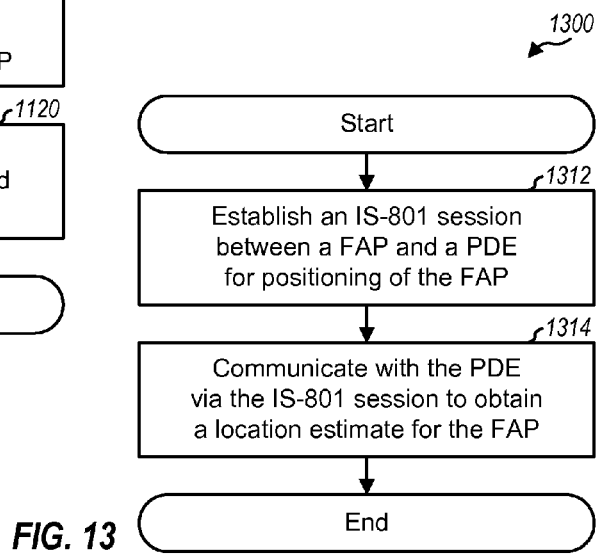
FIG. 13 illustrates a process performed by a FAP for positioning.

FIG. 13 shows a design of a process 1300 performed by a FAP for positioning.

The FAP may establish an IS-801 session with a PDE for positioning of the FAP (block 1312). The IS-801 session may be a mobile terminated IS-801 session initiated by the PDE or a mobile originated IS-801 session initiated by the FAP. The FAP may communicate with the PDE via the IS-801 session to obtain a location estimate for itself (block 1314).

In one design, the IS-801 session may be established during initialization of the FAP. The location estimate for the FAP may be used to determine whether the FAP is allowed to operate on a particular frequency band on behalf of a particular network operator. In another design, the IS-801 session may be established before or after receiving a message from a mobile station to originate an emergency call. The location estimate for the FAP may be used to select an emergency center for the emergency call. The location estimate for the FAP may also be used for other purposes.

Figure 14:
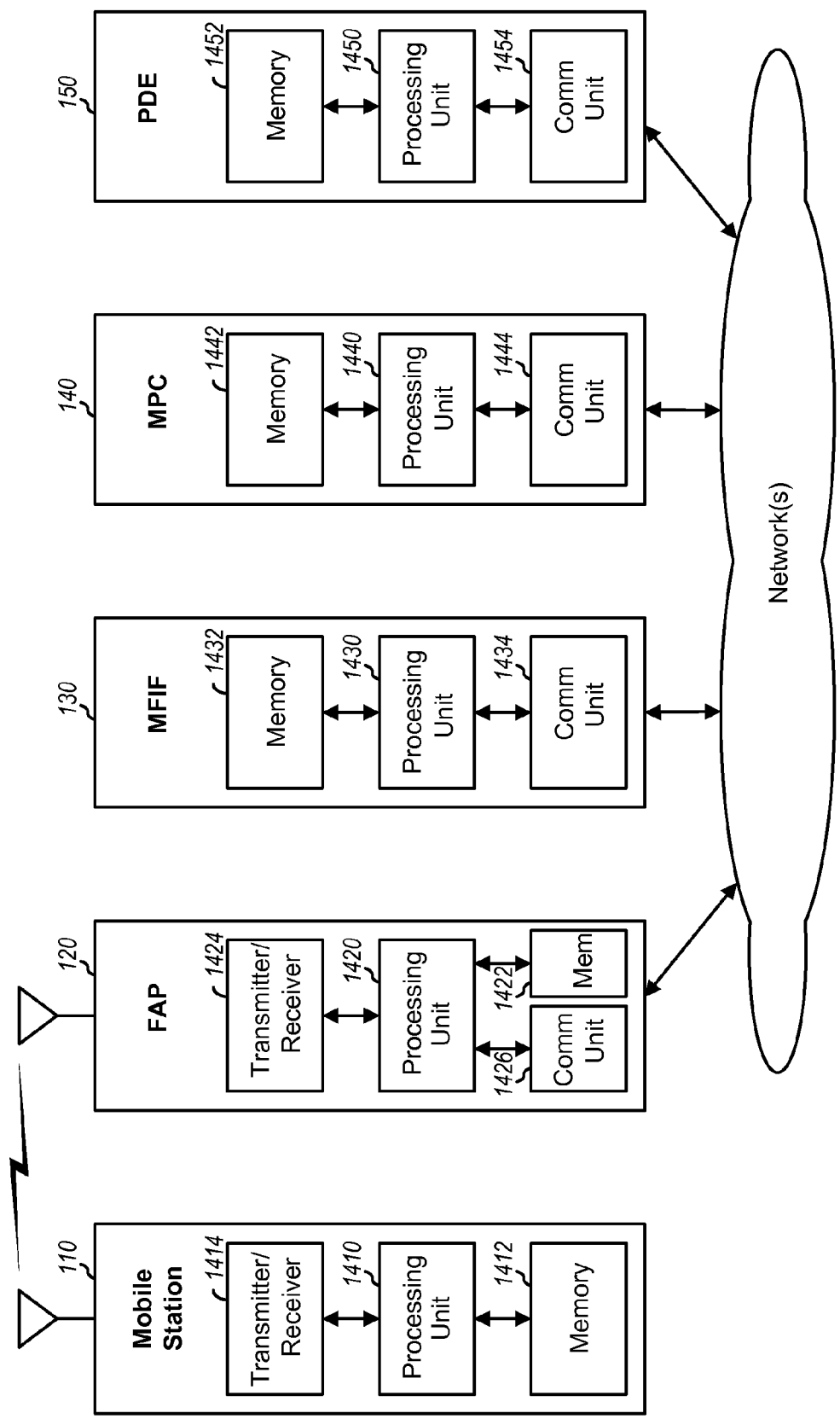
FIG. 14 illustrates a block diagram of a mobile station and various network entities.

FIG. 14 shows a block diagram of a design of mobile station 110, FAP 120, MFIF 130, MPC 140 and PDE 150 in FIG. 1. FAP 120 may transmit traffic data, messages/signaling, and pilot to mobile stations within its coverage area. These various types of data may be processed by processing unit 1420 and conditioned by a transmitter 1424 to generate a forward link signal, which may be transmitted to the mobile stations. At mobile station 110, the forward link signal from FAP 120 may be received via an antenna, conditioned by a receiver 1414, and processed by processing unit 1410 to obtain various types of information for various services such as emergency call, location services, positioning, etc. Mobile station 110 may also transmit traffic data, messages/signaling, and pilot to FAP 120. These various types of data may be processed by processing unit 1410 and conditioned by a transmitter 1414 to generate a reverse link signal, which may be transmitted to FAP 120. At FAP 120, the reverse link signal from mobile station 110 may be received and conditioned by a receiver 1424 and further processed by processing unit 1420 to obtain various types of information.

Processing unit 1410 may perform or direct process 900 in FIG. 9 and/or other processes for the techniques described herein. Processing unit 1410 may also perform the processing for mobile station 110 in the call flows in FIGS. 2 to 6. Processing unit 1420 may perform or direct process 1000 in FIG. 10, process 1300 in FIG. 13, and/or other processes for the techniques described herein. Processing unit 1420 may also perform the processing for FAP 120 in the call flows in FIGS. 2 to 8. Memories 1412 and 1422 may store program codes and data for mobile station 110 and FAP 120, respectively. FAP 120 may communicate with other network entities via a communication (Comm) unit 1426.

Within MFIF 130, processing unit 1430 may perform processing for various functions to support emergency calls, location services, positioning, and other services for FAPs. Processing unit 1430 may also perform or direct process 1100 in FIG. 11 and/or other processes for the techniques described herein. Processing unit 1430 may also perform the processing for MFIF 130 in the call flows in FIGS. 2 to 8. Memory 1432 may store program codes and data for MFIF 130. A communication unit 1434 may allow MFIF 130 to communicate with other network entities.

Within MPC 140, processing unit 1440 may perform processing for various functions to support location services. Processing unit 1440 may also perform or direct process 1200 in FIG. 12 and/or other processes for the techniques described herein. Processing unit 1440 may also perform the processing for MPC 140 in the call flows in FIGS. 2 to 8. Memory 1442 may store program codes and data for MPC 140. A communication unit 1444 may allow MPC 140 to communicate with other network entities.

Within PDE 150, processing unit 1450 may perform processing for various functions to support positioning. Processing unit 1450 may also perform the processing for PDE 150 in the call flows in FIGS. 2 to 8. Memory 1452 may store program codes and data for PDE 150. A communication unit 1454 may allow PDE 150 to communicate with other network entities.

FIG. 14 shows a simplified block diagram of various entities. In general, each entity may include any number of processing units, memories, transceivers, communication units, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, operations, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Mobile station (MS) may refer to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. Mobile station may also refer to devices which communicate with a personal navigation device (PND), such as by short-range wireless, infrared, wireline connection, or other connection—regardless of whether satellite signal reception, assistance data reception, and/or position-related processing occurs at the device or at the PND. Also, mobile station may refer to all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above may also be considered a mobile station.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of supporting emergency calls in a wireless communication network, the method comprising:
    receiving a first message at a first network entity to originate an emergency call for a mobile station accessing a Femto Access Point (FAP);
    obtaining a macro Mobile Switching Center (MSC) ID that is based on a macro cell identity (ID); and
    sending a second message, from the first network entity to a second network entity in response to receiving the first message, to select an emergency center for the emergency call, wherein the second message comprises the macro MSC ID and the macro cell ID, wherein the macro cell ID is based on a location of the FAP.

2. The method of claim 1 further comprising:
    determining the location of the FAP during initialization of the FAP.

3. The method of claim 2 further comprising:
    communicating with a Position Determination Entity (PDE) to obtain a location estimate for the FAP during initialization of the FAP, and wherein the location of the FAP comprises the location estimate.

4. The method of claim 1 wherein the macro cell ID is for a macro cell having a strong received signal at the FAP or having overlapping coverage with the FAP.

5. The method of claim 1 further comprising:
    receiving a request for location of the FAP from the second network entity, and wherein the location of the FAP is sent by the first network entity in response to the request.

6. The method of claim 5 wherein the location of the FAP is used as a location estimate for the mobile station and provided to the emergency center if requested.

7. The method of claim 1 wherein the first network entity is the FAP and the second network entity is a Mobile Application Part (MAP) Femto Interworking Function (MFIF).

8. The method of claim 1 wherein the first network entity is a Mobile Application Part (MAP) Femto Interworking Function (MFIF) and the second network entity is a Mobile Positioning Center (MPC).

9. The method of claim 1 further comprising:
    communicating with a Position Determination Entity (PDE) to obtain a location estimate for the FAP, the location estimate for the FAP being used as a location estimate for the mobile station and provided to the emergency center if requested.

10. The method of claim 9 wherein the communicating with the PDE comprises establishing an IS-801 positioning session between the PDE and the FAP, wherein the location estimate for the FAP is obtained as a result of the IS-801 positioning session.

11. The method of claim 1 further comprising:
    forwarding messages exchanged between the mobile station and a Position Determination Entity (PDE) to obtain a location estimate for the mobile station after the emergency call is originated, the location estimate for the mobile station being provided to the emergency center if requested.

12. An apparatus for supporting emergency calls in a wireless communication network, the apparatus comprising:
    means for receiving a first message to originate an emergency call for a mobile station accessing a Femto Access Point (FAP);
    means for obtaining a macro Mobile Switching Center (MSC) ID that is based on a macro cell Identity (ID); and means for sending a second message to a network entity, in response to receiving the first message, to select an emergency center for the emergency call, wherein the second message comprises the macro MSC ID and the macro cell ID, wherein the macro cell ID is based on a location of the FAP.

13. The apparatus of claim 12 further comprising:
means for determining the location of the FAP during initialization of the FAP.

14. The apparatus of claim 13 further comprising:
means for communicating with a Position Determination Entity (PDE) to obtain a location estimate for the FAP during initialization of the FAP, and wherein the location of the FAP comprises the location estimate.

15. The apparatus of claim 12 wherein the macro cell ID is for a macro cell having a strong received signal at the FAP or having overlapping coverage with the FAP.

16. The apparatus of claim 12 further comprising:
means for receiving a request for location of the FAP from the network entity, and wherein the means for sending are configured to send the location of the FAP in response to receiving the request.

17. The apparatus of claim 16 wherein the means for sending are configured to use the location of the FAP as a location estimate for the mobile station and to send the location of the FAP to the emergency center if requested.

18. The apparatus of claim 12 wherein the apparatus is the FAP and the network entity is a Mobile Application Part (MAP) Femto Interworking Function (MFIF).

19. The apparatus of claim 12 wherein the apparatus is a Mobile Application Part (MAP) Femto Interworking Function (MFIF) and the network entity is a Mobile Positioning Center (MPC).

20. The apparatus of claim 12 further comprising:
means for communicating with a Position Determination Entity (PDE) to obtain a location estimate for the FAP, the means for sending being configured to use the location estimate for the FAP as a location estimate for the mobile station and to send the location estimate for the FAP to the emergency center if requested.

21. The apparatus of claim 20 wherein the means for communicating are configured to establish an IS-801 positioning session with the PDE and to obtain the location estimate for the FAP as a result of the IS-801 positioning session.

22. The apparatus of claim 12 further comprising:
means for forwarding messages exchanged between the mobile station and a Position Determination Entity (PDE) to obtain a location estimate for the mobile station after the emergency call is originated, the means for sending being configured to send the location estimate for the mobile station to the emergency center if requested.

23. A computer-readable storage medium comprising instructions configured to cause a computer to supporting emergency calls in a wireless communication network by being configured to cause the computer to:
receive a first message to originate an emergency call for a mobile station accessing a Femto Access Point (FAP);
obtain a macro Mobile Switching Center (MSC) ID that is based on the macro cell ID; and
send a second message to a network entity, in response to receiving the first message, to select an emergency center for the emergency call, wherein the second message comprises the macro MSC ID and the macro cell ID, wherein the macro cell ID is based on a location of the FAP.

24. The storage medium of claim 23 further comprising instructions configured to cause the computer to:
determine the location of the FAP during initialization of the FAP.

25. The storage medium of claim 24 further comprising instructions configured to cause the computer to:
communicate with a Position Determination Entity (PDE) to obtain a location estimate for the FAP during initialization of the FAP, and wherein the location of the FAP comprises the location estimate.

26. The storage medium of claim 23 wherein the macro cell ID is for a macro cell having a strong received signal at the FAP or having overlapping coverage with the FAP.

27. The storage medium of claim 23 further comprising instructions configured to cause the computer to:
receive a request for location of the FAP from the network entity;
wherein the instructions configured to cause the computer to send are configured to cause the computer to send the location of the FAP in response to receiving the request.

28. The storage medium of claim 27 wherein the instructions configured to cause the computer to send are configured to use the location of the FAP as a location estimate for the mobile station and to send the location of the FAP to the emergency center if requested.

29. The storage medium of claim 23 further comprising instructions configured to cause the computer to:
communicate with a Position Determination Entity (PDE) to obtain a location estimate for the FAP, the instructions configured to cause the computer to send being configured to use the location estimate for the FAP as a location estimate for the mobile station and to send the location estimate for the FAP to the emergency center if requested.

30. The storage medium of claim 29 wherein the instructions configured to cause the computer to communicate are configured to cause the computer to establish an IS-801 positioning session with the PDE and to obtain the location estimate for the FAP as a result of the IS-801 positioning session.

31. The storage medium of claim 23 further comprising instructions configured to cause the computer to:
forward messages exchanged between the mobile station and a Position Determination Entity (PDE) to obtain a location estimate for the mobile station after the emergency call is originated, the instructions configured to cause the computer to send being configured to send the location estimate for the mobile station to the emergency center if requested.

32. An apparatus for supporting emergency calls in a wireless communication network, the apparatus comprising:
a communication unit; and
a processing unit, communicatively coupled to the communication unit, configured to:
receive a first message to originate an emergency call for a mobile station accessing a Femto Access Point (FAP);
obtain a macro Mobile Switching Center (MSC) ID that is based on the macro cell ID; and
send, via the communication unit and in response to receiving the first message, a second message to a network entity to select an emergency center for the emergency call, wherein the second message comprises the macro MSC ID and the macro cell ID, wherein the macro cell ID is based on a location of the FAP.

33. The apparatus of claim 32 wherein the processing unit is further configured to:
   determine the location of the FAP during initialization of the FAP.

34. The apparatus of claim 33 wherein the processing unit is further configured to:
   communicate, via the communication unit, with a Position Determination Entity (PDE) to obtain a location estimate for the FAP during initialization of the FAP, and wherein the location of the FAP comprises the location estimate.

35. The apparatus of claim 32 wherein the macro cell ID is for a macro cell having a strong received signal at the FAP or having overlapping coverage with the FAP.

36. The apparatus of claim 32 wherein the processing unit is further configured to:
   receive a request for location of the FAP from the network entity, and to send the location of the FAP in response to receiving the request.

37. The apparatus of claim 36 wherein the processing unit is configured to use the location of the FAP as a location estimate for the mobile station and to send the location of the FAP to the emergency center if requested.

38. The apparatus of claim 32 wherein the apparatus is the FAP and the network entity is a Mobile Application Part (MAP) Femto Interworking Function (MFIF).

39. The apparatus of claim 32 wherein the apparatus is a Mobile Application Part (MAP) Femto Interworking Function (MFIF) and the network entity is a Mobile Positioning Center (MPC).

40. The apparatus of claim 32 wherein the processing unit is further configured to:
   communicate, via the communication unit, with a Position Determination Entity (PDE) to obtain a location estimate for the FAP, the processing unit being configured to use the location estimate for the FAP as a location estimate for the mobile station and to send the location estimate for the FAP to the emergency center if requested.

41. The apparatus of claim 40 wherein the processing unit is configured to establish an IS-801 positioning session with the PDE and to obtain the location estimate for the FAP as a result of the IS-801 positioning session.

42. The apparatus of claim 32 wherein the processing unit is further configured to:
   forward messages exchanged between the mobile station and a Position Determination Entity (PDE) to obtain a location estimate for the mobile station after the emergency call is originated, the processing unit being configured to send the location estimate for the mobile station to the emergency center if requested.

* * * * *